(12) United States Patent
Marron et al.

(10) Patent No.: US 7,405,834 B1
(45) Date of Patent: Jul. 29, 2008

(54) COMPENSATED COHERENT IMAGING FOR IMPROVED IMAGING AND DIRECTED ENERGY WEAPONS APPLICATIONS

(75) Inventors: Joseph C. Marron, Pittsford, NY (US);
Carl W. Embry, Boulder, CO (US);
AnnMarie Oien, Boulder, CO (US);
Duane D. Smith, Louisville, CO (US);
J. Alex Thomson, Santa Fe, NM (US);
James Pete Tucker, Louisville, CO (US); Samuel G. L. Williams, Cupertino, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 410 days.

(21) Appl. No.: 11/354,449

(22) Filed: Feb. 15, 2006

(51) Int. Cl.
*G01B 9/02* (2006.01)
*G01B 11/02* (2006.01)

(52) U.S. Cl. .................... 356/521; 356/484; 356/450

(58) Field of Classification Search ........... 356/450, 356/456, 484, 521
See application file for complete search history.

(56) References Cited

U.S. PATENT DOCUMENTS

| 6,040,857 | A | * | 3/2000 | Hirsh et al. ............. 348/241 |
| 6,957,099 | B1 | * | 10/2005 | Arnone et al. ........... 600/473 |
| 7,038,791 | B2 | * | 5/2006 | Smith .................... 356/520 |
| 7,333,215 | B2 | * | 2/2008 | Smith .................... 356/520 |
| 2005/0006559 | A1 | * | 1/2005 | Smith ................. 250/201.9 |
| 2005/0015233 | A1 | * | 1/2005 | Gordon ................... 703/13 |
| 2006/0049331 | A1 | * | 3/2006 | Smith ................. 250/201.9 |

OTHER PUBLICATIONS

S.S. Chesnokov and I.V. Davletshina, Simplex Method in Problems of Light-Beam Phase Control, Applied Optics, Dec. 20, 1995, vol. 34, No. 36.

J.R. Fienup and J.J. Miller, Aberration Correction by Maximizing Generalized Sharpness Metrics, Optical Society of America, Apr. 2003, vol. 20, No. 4.

Thomas Weyrauch and Mikhail A. Vorontsov, Atmospheric Compensation with a Speckle Beacon in Strong Scintillation Conditions: Directed Energy and Laser Communication Applications, Applied Optics, Oct. 20, 2005, vol. 44, No. 30.

(Continued)

*Primary Examiner*—Patrick J Connolly
(74) *Attorney, Agent, or Firm*—McDermott Will & Emery LLP

(57) ABSTRACT

An imaging method and associated system for producing high-resolution images. The method includes illuminating an object or scene with coherent radiation such as beams from a laser and then, collecting scattered light with a plurality of subapertures rather than a single large aperture. The method continues with coherently detecting, such as with heterodyne detection, the scattered light to measure the complex amplitude incident on each subaperture and digitally reconstructing images from the coherently detected light for the subapertures. Then digital co-phasing is performed on the subapertures using an image sharpness or quality metric to form an image having the resolution of the total subaperture area. The method may also include determining an aimpoint in the formed image, calculating a phase screen, directing laser beams through the subapertures towards the aimpoint, and co-phasing the laser beams by applying the phase screen to form a single beam.

20 Claims, 16 Drawing Sheets

OTHER PUBLICATIONS

Richard A. Muller and Andrew Buffington, Real-Time Correction of Atmospherically Degraded Telescope Images Through Image Sharpening, Journal of the Optical Society of America, Sep. 1974, vol. 64, No. 9.

Jeffrey C. Lagarias, James A Reeds, Margaret H. Wright, and Paul E. Wright, Convergence Properties of the Nelder-Mead Simplex Algorithm in Low Dimensions, Technical Report 96-4-07, Lucent Technologies, Bell Labs Innovations, Revised Version, May 1, 1997.

Paxman, R. G. and Marron, J. C., "Aberration Correction of Speckled Imagery with an Image-Sharpness Criterion," Proc. SPIE 976, 37-47 (1988).

\* cited by examiner

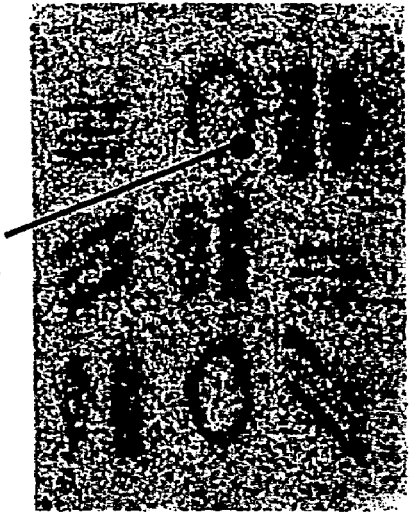
(c) Sharpened image after co-phasing
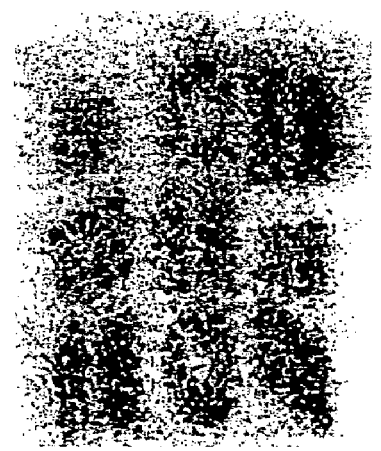
(b) Image before co-phasing
FIG. 7
(a) Entrance pupil

COMPENSATED COHERENT IMAGING FOR IMPROVED IMAGING AND DIRECTED ENERGY WEAPONS APPLICATIONS

BACKGROUND OF THE INVENTION

1. Field of the Invention.

This invention is in the field of remote sensing and more specifically in the area of coherent laser radar system used for imaging, adaptive beam forming, and directed energy weapons.

2. Relevant Background.

Laser radar (ladar) systems are used to gather information about targets by sending a laser beam from a transmitter to the target, collecting light scattered from the target, and processing the received light to extract information. Hard-target ladar systems scatter light from natural or man-made targets and the information of interest for extraction includes: range, velocity, vibrations, shape, materials, and surface properties such as texture or color. Future military systems will rely heavily on the use of ladar systems to perform functions that include intelligence gathering, surveillance and reconnaissance imaging, target designation, communications and directed energy. There are, however, several difficulties in optimally performing these functions. One difficulty is that of overcoming atmospheric turbulence, which distorts optical wavefronts and hence degrades images. A second difficulty is that high-resolution imaging fundamentally requires large apertures, since the resolution of imaging systems is proportional to $\lambda/D$, where $\lambda$ is the wavelength and D is the aperture diameter. For example, the aperture diameter required to produce a laser spot with 5 cm size (or an imaging system with spatial resolution of 5 cm) at $\lambda=1.5$ $\mu$m and a stand-off distance of 50 km is 1.5 m. Incorporating such a large aperture onto an aircraft or Unmanned Aerial Vehicle (UAV) is extremely difficult, not only because of the required surface area, but also because of the volume required to encompass the focal length of the optics, as well as any required sensors.

The problems associated with high-resolution imaging are well-known in astronomy, as well as in military systems, where atmospheric degradation limits the useable aperture of telescopes. In astronomy, passage of light from distant stars through the turbulent atmosphere to a terrestrial telescope results in severe degradation of the image quality if the coherence area at the telescope is substantially smaller than the physical light collection area. The coherence area, defined as the area over which the received light is considered to be spatially correlated, is in turn determined by refractive index variations in the optical path experienced by light beams propagating through different paths in the atmosphere, as well as by aberrations present in the optics. When the coherence area is significantly smaller than the physical aperture of the imaging system, the telescope can be viewed as performing an incoherent addition of multiple images from smaller telescopes. Since the spatial resolution of an imaging systems is directly proportional to the aperture diameter, such images will be degraded in relation to what they would be in the absence of atmospheric distortions. This very significant problem is currently addressed using adaptive optics based around wavefront sensors and deformable mirrors. For example, in an increasingly common astronomical adaptive optics system, a laser beam at 589 nm is used to illuminate sodium atoms high in the atmospheres. Light scattered from the sodium is collected with an adaptive optics system. By sensing the wavefront across the full aperture using Shack-Hartmann sensors, for example, and deforming the mirror appropriately to compensate for the local phase distortions, the one-way atmospheric effects can be compensated for and the image quality improved. Such systems work well in some circumstances but are of limited use for ladar systems. In particular, they do not address the issue of compactness. Astronomical telescopes are large but, since they are most frequently ground-based, there is generally not a strong constraint on dimensions. The situation is very different in airborne imaging scenarios where space is at a premium. Furthermore, astronomical adaptive optics systems rely on the presence of an artificially created beacon, such as the deliberately excited sodium emission, to perform the compensation.

It is furthermore recognized (see, e.g., the paper "Atmospheric compensation with a speckle beacon in strong scintillation conditions: directed energy and laser communication applications" by Weyrauch and Vorontsov, Applied Optics vol. 44, pp. 6388, 2005) that conventional methods using Shack-Hartmann sensors fail to work well under conditions of strong atmospheric turbulence.

A well-known non-astronomical system that deploys adaptive optics is the Airborne Laser (ABL) developed for missile defense applications. This highly complex system incorporates a high energy laser with the capability to lock onto and track targets. To do so effectively, as well as to concentrate the high energy laser pulse in a small area, the system incorporates wavefront sensing and deformable mirror technology to adjust the wavefront of the transmitted beam. The current lack of a compact and reliable method of implementing wavefront correction, especially over a significant field-of-view, is problematic. Improved solutions for ABL and other directed energy weapons are highly sought after.

Adaptive optics methods are also desired for subaperture co-phasing applications, such as when multiple mirrors are assembled to form a large telescope. U.S. Pat. No. 5,905,591 to Duncan et al. describes a method of adjusting the relative position of multiple small telescopes (subapertures) to create a large aperture area space borne telescope capable of producing high resolution. A disadvantage of the described method is that it uses actuators and phase sensing devices to maintain the relative position of all subapertures, which adds to the complexity of the structure.

U.S. Pat. No. 6,229,616 to Brosnan et al. describes a wavefront sensor capable of measuring the phase fronts across a large aperture without performing any corrections to an image. The described system has several disadvantages. First, the local oscillator is derived from an arbitrary point, as opposed to a point that has been selected for its desirable scattering properties, which generally makes it very weak. The local oscillator may be amplified before mixing with the signal. However, optical amplifiers add (often substantial amounts of) noise, which degrades the sensitivity of the system, and, further, this is an approach that may only work in very limited circumstances when the signal-to-noise ratio (SNR) is high. The method described may be useful for measuring wavefront amplitudes but does not disclose how that information can be used to produce high resolution imagery or how it can be utilized to transmit a laser beam to produce high on-target energy density. Additional differences between the Brosnan approach and that of the present invention will be clarified in the text that follows.

A further issue of considerable importance in imaging through turbulence is that of anisoplanatism. Turbulence is spatially inhomogeneous which means that light propagating from an extended target experiences varying degrees of distortions depending on which part of the turbulent region the light propagated through. As seen from the imaging sensor, the distortions are only approximately constant over a small angular range, referred to as the isoplanatic angle. The target size corresponding to the isoplanatic angle is referred to as the isoplanatic patch or isoplanatic diameter. Conventional adaptive optics using deformable mirrors can only correct for one isoplanatic angle and generally require complex multi-conjugate optics to perform corrections over a wide field of view (FOV).

Anisoplanatism is of importance not only in imaging of a target but also illumination with a high energy beam. Subject systems can be used for two near simultaneous purposes. One is the imaging function discussed above. The second is in transmitting a high energy laser beam aimed at damaging or destroying the target. In this case, an important parameter is delivering a maximum amount of energy density (energy per unit area) to the target, which means that the footprint of the illuminating beam should generally be minimized. This in turn means that the beam should be predistorted in such a way that an initially distorted beam becomes undistorted after propagation through the turbulent atmosphere to the target. Since the distortions vary with look angle, the system should be able to measure and apply predistortions over an extended range of angles.

SUMMARY OF THE INVENTION

The present invention addresses the aforementioned difficulties using a multi-aperture segmented system that enables high resolution targeting and imaging in the presence of atmospheric turbulence, platform vibration, and practical space limitations. This approach uses an array of subaperture transceivers. At start-up, the subapertures illuminate a scene with coherent laser light. The individual sub-apertures then sense this light and determine the atmospheric and system induced phase aberrations using digital methods as discussed in detail below.

In one aspect of this approach, coherent detection is used at each subaperture and then digital generation is used to produce a single high-resolution image. This avoids the difficulty of current approaches that incorporate a wavefront sensor and a deformable mirror. In a second aspect, an array of subapertures can be mounted conformally to the surface of an aircraft or vehicle, whereas a large single aperture is more difficult to mount. In a third aspect, digital corrections for the image are determined as a function of position in the field-of-view and field dependent corrections are applied to correct for anisoplanatism.

Once the aberrations are determined, the aberration values are fed to each transceiver of the array which pre-distorts the transmit beam to produce a small spot on the target. It is possible to impart high-bandwidth correction by using high-speed actuators such as fast tip-tilt actuators for each subaperture with electro-optic (EO) phase modulators for piston correction. Lower speed devices, such as liquid crystal spatial light modulators (SLMs), or piezo mirrors can also be used to adapt the beam for lower bandwidth processes.

BRIEF DESCRIPTION OF THE DRAWINGS

FIG. 7 shows an example of image improvement by co-phasing seven subapertures.

DETAILED DESCRIPTION OF THE PREFERRED EMBODIMENTS

Figure 1:
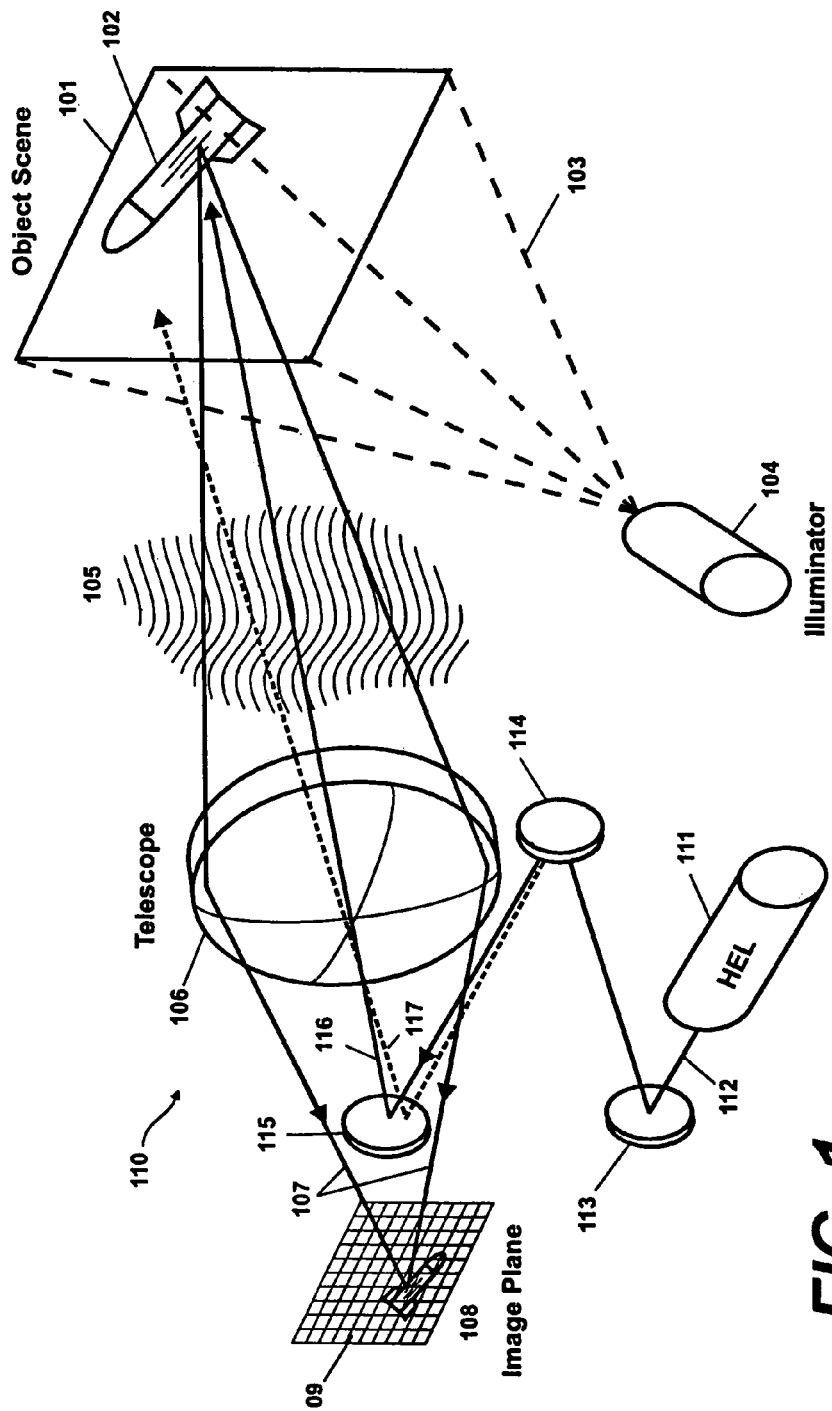
FIG. 1 illustrates the general imaging and directed energy weapon (DEW) scenario.

The general scenario under consideration is illustrated in FIG. 1. An object or target scene 101 containing one or more objects of interest 102 is illuminated with coherent light 103 from an illuminator laser 104. The illuminator 104 may be arranged to be coaxial with the light receiving system but is shown as separate for clarity. Light scattered from the target scene 101 travels back to a receiving system 110 comprising generally a telescope 106 and an image plane 108 that incorporates a detector array having many detection elements exemplified by numeral 109. By virtue of the imaging properties of the telescope 106, light rays 107 emanating from a given point in the target scene 101 converge at a given point in the image plane 108. For simplicity, the telescope 106 is illustrated here as a simple lens but, as will be discussed below, reflective mirrors are frequently superior when the aperture size of the telescope 106 is large.

For strict imaging situations, this is the full function of the imaging system. In some cases, such as directed energy weapons (DEW) applications, it is desired to use the information contained in the image to locate a target of interest and then direct a high energy laser (HEL) to the target in order to damage or destroy it. This is generally done by using a HEL 111 to produce a laser beam 112 that is reflected from mirrors 113-115 in such a manner that the transmitted beam is generally coaxial with the receiver telescope 106. While using a separate telescope is clearly possible, using the same aperture has several advantages including eliminating the need to maintain co-alignment between two large aperture optics. It is generally also the case that at least two of the mirrors 113-115 can be tilted around two axes in order to steer the transmitted beam to a desired location in the object plane. As an example, two possible beams 116 and 117 are illustrated in the figure.

The difficulties in designing this type of system arise because the atmosphere between the transceiver location and the object plane is nearly always turbulent. This means that both received and transmitted light pass through a region of space 105 where spatial and temporal variations in the refractive index distorts the light propagation in such a way that images received at image plane 108 are highly distorted or even completely unintelligible. The effect of refractive turbulence is that the spatial (and temporal) coherence of light is reduced. A useful measure of spatial coherence is the coherence diameter $r_0$ which denoted in a statistical sense is the diameter over which spatial coherence is high. If the coherence diameter is significantly smaller than the receiver aperture, images will be severely degraded because the large aperture acts as a multiplicity of small apertures rather than one large aperture. On the one hand, turbulence, therefore, means that it is difficult to identify a target. On the other hand, the wavefront distortions imposed by turbulence also mean that a perfectly clean transmitted beam would be distorted in propagating to the target and cannot deliver the same energy density at a target as it would in the absence of distortions.

Figure 2:
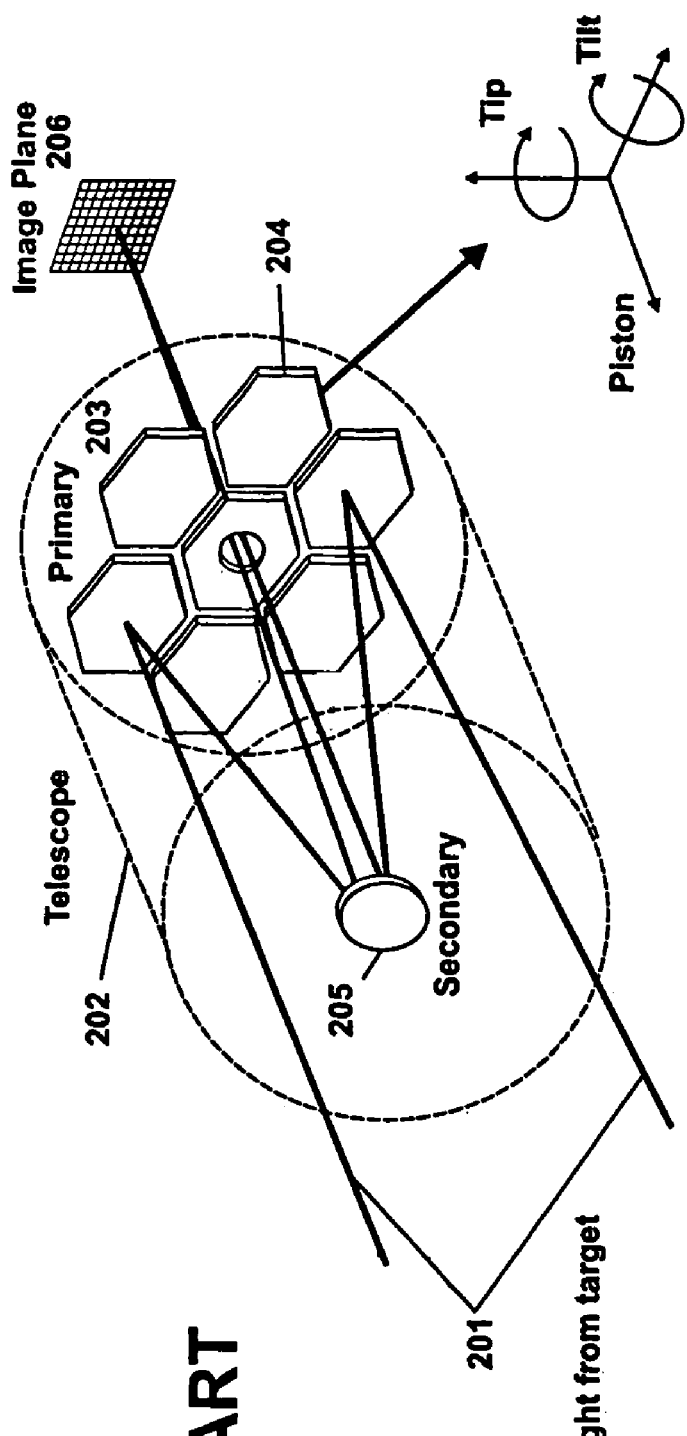
FIG. 2 illustrates a conventional large aperture imaging solution according to the prior art.

A further problem with this simple scenario is the impracticality of designing telescopes that have a large receiving aperture while also not having large volume and weight. For this reason, large telescopes frequently have a construction similar to the one illustrated in FIG. 2. As shown, light 201 from an object or target is received with a telescope 202 and directed to an image plane 206. The telescope itself includes a primary reflector 203 and a secondary reflector 205. The secondary reflector 205 is generally small and of less concern than the primary reflector 203 since the primary 203 has a diameter equal to the receiving aperture of the system. For this reason, it is desirable to fabricate the primary 203 not from one single surface but from a number of (typically hexagonal) segments that are then positioned carefully to act as one large continuous surface. This means that each mirror segment is carefully positioned or aligned with respect to three parameters: tip, tilt, and piston. The first two parameters refer to rotations as shown, whereas the piston parameter refers to translation in the axial direction of the telescope 202.

Figure 3:
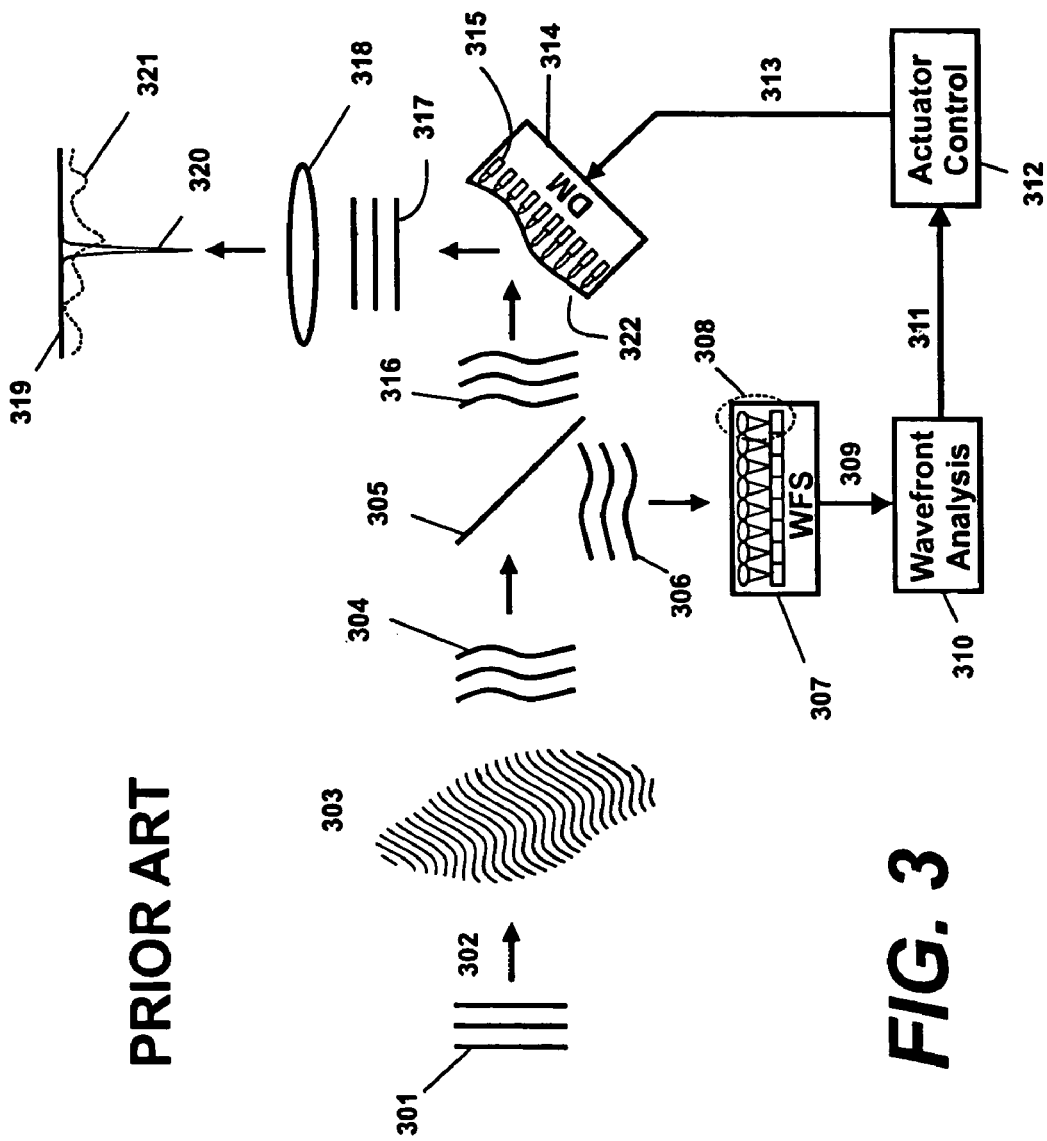
FIG. 3 illustrates an architecture incorporating a deformable mirror according to the prior art.

Adaptive optics (AO) techniques have been developed to reduce the effects of turbulence and to keep segmented telescopes properly aligned. An exemplary implementation using wavefront sensors (WFS) and a deformable mirror is illustrated in FIG. 3. Numeral 301 denotes a set of flat wavefronts that propagate in a direction 302 through a turbulent region of space or imperfect optics 303 causing the flat wavefronts to become distorted as illustrated at 304. Beam splitter 305 splits off a fraction of the optical power and directs the distorted sample 306 to a wavefront sensor 307. The purpose of wavefront sensor 307 is to detect spatially local deviations in flatness of the wavefronts 306. This is frequently done using a set of Shack-Hartmann (SH) sensor elements 308 that transmits signals 309 to a wavefront analysis unit 310. This unit 310 determines local variations in wavefront and sends signals 311 to an actuator control unit 312, which in turn sends control signals 313 to a deformable mirror (DM) 314. The deformable mirror 314 may comprise a multiplicity of electro-mechanical actuators 315 that deform the surface of an attached mirror 322. The goal of the deformation is to operate on the wavefronts 316 transmitted through beam splitter 305 in such a way that the wavefronts 317 reflected from DM 314 are again flat. When this is done, the wavefronts 317 can be focused using a lens 318 onto an image plane 319 to produce a highly localized intensity distribution 320 corresponding to a substantially diffraction limited wavefront. In the absence of deformation of mirror surface 322, the light distribution would be smeared out at the image plane as indicated by light distribution 321.

It is also evident that the system as described is reciprocal. Injection of a laser beam with undistorted wavefronts 317 but propagating backwards through the system will likely cause the beam to become distorted ("pre-distorted") in reflecting from DM 314 but will become undistorted after propagating through distorting medium 303. It is further evident that a system designed in this manner can only correct for one field angle corresponding to one target plane location. As stressed in the prior discussion, this is a serious limitation since it means that new corrections must be computed for each potential target point. To correct this anisoplanatism with conventional adaptive optics, researchers have proposed using multiple stages of deformable mirrors (multi-conjugate approach), but, unfortunately, this method has limited correction capability and is very complex to implement.

With operation of conventional systems described above in some detail, it is now easier to delineate the advantages of embodiments of the present invention over the prior art. One difference is that embodiments of the present invention typically contain no deformable mirror or other mechanical elements to carry out the functionality described with reference to FIG. 3. Rather, the wavefront analysis is preferably carried out digitally to produce high resolution imagery. This way of solving the problem has numerous advantages over the prior art as will become evident in the description that follows.

As an example of a practical system, Table 1 describes several of the key parameters for an aircraft based system that might be used for a reconnaissance application. These parameter values are stated as examples only. Practical applications cover a large range of each parameter. For example, the range to the target may vary from less than one meter to much greater than 100 km for space imaging applications. Similarly, the aperture size may vary from values in the few mm range at short ranges to several meters for space imaging. Note that the isoplanatic angle $\alpha_0$ and the isoplanatic patch diameter are related through the equation $D_0 = R\alpha_0$.

TABLE 1

Scenario Parameters for an example Airborne AO system.

| Tactical Scenario | | Typical Quantities | |
|---|---|---|---|
| Target Range R | 10 km | Wavelength | 1.5 µm |
| Required imaging resolution | 1 cm | Aperture size | 1.5 m |
| Required FOV | 10 m | $r_0$ | 0.3 m |
| Number of Pixels | 1 Mpixels | $\alpha_0$ | 100 µrad |
| Platform Velocity | 200 m/sec | Isoplanatic patch diameter $D_0$ | 1.0 m |

The imaging coherence diameter $r_0$, as limited by turbulence for an airborne platform range of 10 km operating at $\lambda=1.5$ µm, is for a typical case on the order of $r_0=0.3$ m. Since an optical receiver aperture size of 1.5 m is significantly larger than the coherence radius, an adaptive optic system generally is required to image with high resolution or to place a small spot on the target. Furthermore, because the platform (aircraft) can be moving through the atmosphere at high speed, the adaptive optic system typically must have a high bandwidth to allow for the platform's motion through the turbulence. The timescale for fluctuations of turbulence can be described by the so-called Greenwood frequency which, for the above example, implies a typical correction bandwidth approaching 1 kHz. To maintain this imaging or targeting resolution on an aircraft or UAV, a segmented aperture is useful, since it is highly unlikely that a single 1.5 m aperture can be fitted within the available platform envelope.

Another important consideration in this scenario is that the isoplanatic patch diameter is 1.0 meter. This indicates that in order to adapt for the atmospheric phase distortions, the system preferably imparts a different correction for every one-meter region of the object plane. With the required FOV being roughly 10 meters, 10×10 distinct corrections are used to produce an entirely in-focus image.

The method used in the present invention to retrieve high resolution images with compact optics generally includes the following four steps:

1. Divide the full receiving aperture into a number of smaller subapertures (or provide a receiving aperture assembly that includes a plurality of subapertures).

2. Illuminate the scene of interest with an illumination laser.

3. Receive scattered light and reconstruct the wavefronts incident on each subaperture using coherent detection techniques.

4. Co-phase the subapertures digitally to reconstruct an image with resolution substantially equivalent to the full receiving aperture.

In cases where the system is also used for transmission of a weapons class laser beam to a target, the above four steps may be augmented with one or more of the following five additional steps:

5. Determine the aimpoint in the reconstructed high resolution image.

6. Calculate a phase screen for the target aimpoint.

7. Direct the pointing direction of the weapons laser beam.

8. Predistort the weapons laser beam with the calculated phase screen.

9. Fire the weapons laser beam.

Advantages of the disclosed approach over conventional adaptive-optic approaches include, but are not limited to:

Atmospheric compensation is done with high-speed phase actuators/modulators

Much of the transmitter can be optical fiber based for compact size and ease of alignment Individual sub-apertures can be smaller than $r_0$ for piston-tip-tilt only correction Phase corrections need only determine/apply modulo $2\pi$ phase corrections, in contrast to broad-band methods which require full phase Fully corrected images are formed digitally at high rates, whereas conventional adaptive optics have low bandwidth correction Anisoplanatism is corrected digitally without the need for multiple deformable mirrors Subaperture images are combined digitally, eliminating the need for optically exact, rigid metering trusses Each subaperture contains a focal plane array (FPA) for detection. This ensures that parallel processing is inherent and reduces signal processing bandwidth requirements Distributing the light reception and processing over a number of subapertures reduces the susceptibility to system outages in case a small number of subapertures are damage accidentally or through deliberate hostile actions. Such "graceful degradation" is highly desirable for systems subject to hostile threats.

The steps above will now be discussed in detail, beginning with the steps required to retrieve high resolution images.

High-Resolution Imaging

Step 1. Subaperture creation. FIG. 4(a) illustrates the top-level approach to imaging and shows the system comprising an array of coherent transmitters/receivers (transceivers) with a 1.5 m baseline full aperture 401. An individual transceiver element is illustrated as element 402. For the nominal design case outlined in Table 1, the individual transceiver sub-apertures may have diameters d near the value of $r_0$=0.3 m. When designed such that d<$r_0$, full reconstruction of high resolution images from the subapertures means that they may only need piston/tip/tilt correction, although it is stressed that higher-order corrections across each sub aperture are also possible with the methods of this invention. The subdivision of the full aperture into multiple subapertures has several advantages. First, smaller optical elements can be designed and fabricated. For the same optical performance, cost and weight of optics generally rises faster than the area so this approach leads to lower cost and lower weight. Second, the volume of the system can be reduced, generally by a factor of order d/D. This is so because designs are typically driven by the F-number, which is the ratio of aperture diameter to focal length. For a given F-number, N subapertures of diameter d then have a length and volume 1/N times that of the larger aperture. In practice, it is easier to make low F-number optics with small apertures so the actual gain in length and volume may be considerably greater.

FIG. 4(b) shows a cross-section of a subaperture transceiver (ST) 402 of the invention. While details of the construction will be discussed below, the main elements are as follows. The ST 402 comprises two subsystems, one being the telescope 420 and the other the transmit/receive portion 430. The telescope 420 may be designed in a number of ways well known in the art but typically includes a large primary mirror 404 that transmits light 418 to, and receives light 403 from, a distant object, and a smaller secondary mirror 405 that directs demagnified light from the telescope section 420 to the transmit/receive section. The transmit/receive section 430 may also be constructed in several ways as will be discussed below but generally includes several common elements. One element is the transmit/receive (T/R) switch 406 that acts to split the paths of transmitted and received light. In many practical cases, the T/R switch 406 is composed of a polarizer 407 having a coated surface 409 that transmits light with one linear polarization state and reflects light having the opposite polarization state. Thus, if a laser beam to be transmitted 412 is directed using optics 413 to be incident on the polarizer 407, the beam 412 is reflected off coating 409 and is transmitted out to the target as beam 418. In transiting through the system 402, the beam 412 also passes through a quarter-wave plate (QWP) 408 that imparts a circular polarization state on the beam 412. Light 403 scattered from the target then returns through the telescope 420, passes again through QWP 408 and, in the process, acquires a linear polarization state opposite to that which was transmitted. As a result, the received light passes substantially unimpeded through coating 409 and enters the receiver 410. The receiver 410 construction will be discussed below but typically contains a detector array which converts optical signals to electrical signals 411 for transmission to a signal processing system. Depending on the implementation method it may also include injection of external inputs 414.

Step 2. Illumination. In order to receive light and perform the imaging function, the target scene is first illuminated with coherent laser light. The term "light" refers here generally to electromagnetic radiation having a wavelength from the deep UV around 100 nm to the far infrared having a wavelength of several tens of micrometers. Although the techniques disclosed herein may be successfully applied to any wavelength in this range, most practical systems of interest operate in the near infrared spectral range between 800 nm and several micrometers. Of particular interest are systems operating near 1 micrometer, 1.5 micrometer and 10 micrometers because efficient lasers and other system components are available at these wavelengths. As discussed in conjunction with FIG. 1, it is possible to illuminate a target scene with a laser that is not co-aligned with the receiving optics. However, it is also feasible to illuminate the scene with light injected as beam 412 into each of the subaperture transceivers 402.

Step 3. Coherent Detection. The third step comprises detection of the complex amplitude (amplitude and phase) of the light reaching the ST 402 and reconstruction of an image having a spatial resolution substantially limited by the ST 402 aperture diameter d. The complex amplitude of the electromagnetic field at the entrance aperture to the telescope 420 is related to the image plane amplitude through a Fourier transform. Hence, reconstruction of the complex amplitude at the entrance aperture (pupil plane) permits digital reconstruction of an image.

As will be discussed further below, in cases where the coherence diameter $r_0$ is greater than d, the complex amplitudes at different STs differ only in the three basic parameters of tip, tilt, and piston (TTP). Thus, reconstruction of an image with resolution corresponding to the full aperture D is possible if the TTP parameters are determined first for each ST 402.

Measurement of the complex amplitude of the light at the entrance pupil is possible using a variety of techniques. Coherent detection methods are particularly suited for this purpose and is the approach discussed here. In the general case, coherent detection mixes the received signal having a temporally (t) and spatially ($\vec{r} = (\vec{x}, \vec{y})$) varying electric field $E_s(\vec{r},t) = A_s(\vec{r}) \cdot \exp(\Phi_s(\vec{r},t))$, where the field has been separated into an amplitude $A_s$ and a phase $\Phi_s$, with a local oscillator field of the similar form $E_{LO}(\vec{r},t) = A_{LO}(\vec{r}) \cdot \exp(\Phi_{LO}(\vec{r},t))$. As is well known, this gives a measured intensity of the form $$I(\vec{r},t) = |E_s(\vec{r},t) + E_{LO}(\vec{r},t)|^2 = |A_s|^2 + |A_{LO}|^2 + 2A_s A_{LO} Re[\Phi_s(\vec{r},t) - \Phi_{LO}(\vec{r},t)] \quad (1)$$

It is the last term that permits recovery of the complex amplitude of the signal field. Coherent detection can be divided into a number of cases depending on the specific form of the local oscillator field. As will be discussed in a later section, all approaches are suitable for the present invention. In this section, we will disclose the use of spatial heterodyning, as it is in many instances the preferred approach. In spatial heterodyne measurements, the local oscillator amplitude is held substantially constant across the spatial extent of the signal field. However, the wavefronts are tilted with respect to the signal field wavefronts, corresponding to a local oscillator phase term of the form $\Phi_{LO}(\vec{r},t) = \vec{k} \cdot \vec{r}$, where $|\vec{k}|$ is chosen to be large enough to exceed the spatial frequency content of the signal. Selecting k in this manner produces a carrier spatial frequency k analogous to time domain carriers, in the sense that mixing the signal field with the carrier produces an encoded high frequency signal that does not have the phase ambiguities of a baseband (carrier-free) signal.

FIGS. 5(a) and 5(b) illustrate features of the spatial heterodyne technique. FIG. 5(a) shows an object 501 that scatters light 502 which enters the entrance pupil 504 of a subaperture transceiver. The light source illuminating the object is not shown for clarity as it has been discussed above. A detector array 505 containing a number of sensing elements is placed at the entrance pupil. Simultaneously, a local oscillator beam 503 is incident at an angle to the received light and mixes coherently with the received light on detector array 505. The mixing of received signal and LO light produces a spatially varying intensity (beat) signal in the detector array 505 which is read out and processed.

Although the method used in FIG. 5(a) can in principle be implemented, when the entrance pupil 504 is large, it would require a very large detector array, which is generally undesirable. For this reason, it is more desirable to reimage the entrance pupil 504 with a demagnification that matches a predetermined detector array size. This approach is illustrated in FIG. 5(b), where a telescope comprising lenses 506 and 507 images the entrance pupil onto detector array 505. The demagnification M is selected to be, for example, M=25, such that a 300 mm pupil diameter images to a 12 mm detector array diameter. The local oscillator beam 510 may now be injected from the side as shown, and the coherent mixing of the two beams occurs at a partially reflecting mirror 508. The mirror 508 has the property that a predetermined fraction of the received light, such as, but not limited to, 80%, is transmitted through the mirror 508, while simultaneously a fraction, in this case 20%, of the LO light is reflected from the mirror 508. The result of this mixing is that both received light and LO light propagates through field stop 509 and lens 507 to detector array 505. The field stop 509, which is generally optional, may be used to limit the spatial frequency content of the light reaching detector array 505 and is generally useful to limit high spatial frequency noise. The result of mixing the two signals in such a manner that the centroids of the received light and the LO light do not overlap at the field stop is that the LO light 510 will produce a spatial beat signal with the signal light at the detector array 505.

Figure 6:
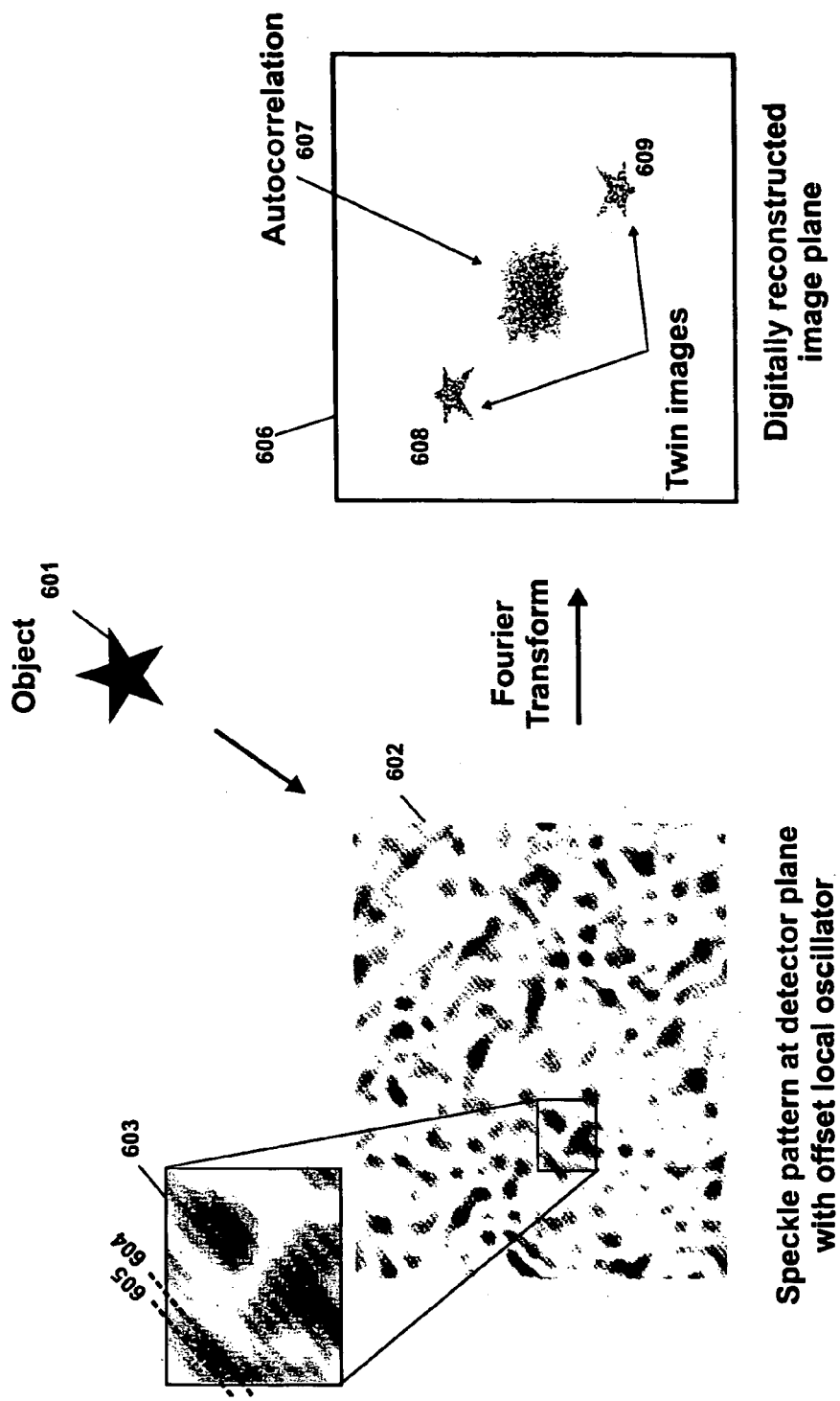
FIG. 6 shows an example of image reconstruction using the spatial heterodyne method.

In this method, intensity data is recorded at the detector array 505, which is then processed digitally to recover images. This is a straightforward process since for coherent imaging the image amplitude can be recovered by a Fourier transform (FT) of the pupil data. FIG. 6 illustrates such recovery. In FIG. 6, the illuminated object 601 is a star whose scattered light produces a speckle pattern at the entrance pupil. This speckle pattern is reimaged to the detector array plane, and a tilted local oscillator beam is mixed with the scattered signal light. An intensity image received at the detector array is shown as image 602. Examination of a portion 603 of this image 602 reveals that the speckle pattern is modulated by a spatial carrier frequency. This can be seen as the lines running through image portion 603 parallel to indicated lines 604-605. Fourier transforming the detected intensity distribution produces the image 606 containing three principal features. The central 'blob' 607 is the autocorrelation of the object and LO fields and includes the Fourier transform of the first two (intensity) terms in equation 1, while two real images 608, 609 of the object 601 are also recovered. The separation distance of these images 608, 609 from the autocorrelation blob 607 is proportional to the spatial frequency of the carrier. A lower carrier frequency decreases the separation whereas a higher carrier frequency increases the separation. In practical cases, the choice of carrier frequency is subject to two constraints. One constraint is that the carrier frequency should be at least twice as high as the highest spatial frequency of the signal light. This ensures that the images 608, 609 do not overlap with the autocorrelation blob 607. The second constraint is that the carrier frequency should generally be no more than half the spatial frequency of the detector elements (Nyquist criterion) to prevent aliasing. This example illustrates that images of an object can be extracted digitally from single apertures. The spatial resolution of the image is in this case limited by the dimensions of the entrance pupil.

Step 4. Co-Phasing of Subapertures. Once the complex valued data is recorded by the individual sparse apertures, the process of forming an image with the resolution of the synthetic aperture includes simply placing data from the sub-apertures into a larger 2 D array and computing the Fourier transform. Note that if the individual sub-apertures have the wrong piston, tip, and tilt phases, an aberrated (low resolution) image will result. This step is then aimed at adjusting the overall tip/tilt/piston (TTP) phases of each subaperture transceiver in order to synthesize an aperture area equal to the sum of all the subapertures. This process is referred to as co-phasing the subapertures.

A number of methods can be used for this full aperture synthesis and each generally constitute specification of an image metric followed by iterative digital computations that aim to maximize (or in some cases minimize) the metric. In the case where each of N subapertures have three degrees of freedom—tip, tilt, and piston—a full calculation involves 3N parameters that can be varied to optimize the metric.

A preferred method uses iterative calculations of metrics based on image sharpness. Image sharpness metrics were originally proposed by Muller and Buffington ("Real-Time Correction of Atmospherically Degraded Telescope Images Through Image Sharpness," JOSA 64, 1200-1210, 1974). The authors of that publication considered quantities such as $$S_1 = \sum_m \sum_n (I(m, n))^2,$$

which is the sum over the image pixels of the intensity squared and found that maximizing this quantity produced an image of maximum spatial resolution. They found that sharpness is maximized when the image has the least amount of aberration. In fact, image sharpness is commonly used in the auto-focus electronics of cameras. Note that when sharpness is applied to incoherent imaging, one typically has to physically correct the aberration and then recompute the sharpness, whereas with coherent imaging the process is done digitally and the correction is physically applied when it is know to be optimal. Through digital rather than physical iteration, coherent imaging can correct for aberrations very quickly. As a result, in the present invention, since the aberrations can change with millisecond time-scales, "digital focusing" is a key advantage.

Muller and Buffington only showed that image sharpness metrics work for incoherent imaging. Subsequently Paxinan and Marron showed ("Aberration Correction of Speckled Imagery with an Image Sharpness Criterion," Proc. SPIE 976, 37-47, 1988) that this approach also works on coherent imagery by using the multiplicative speckle noise model. The distinction between incoherent and coherent imaging is important since coherent imaging must contend with speckle effects that are not present in incoherent imaging.

The method used in the present invention is to calculate a synthetic superposition of the images from all subapertures and calculate the sharpness of the synthetic image using $S_1$ as the metric. The three TPP parameters of each subaperture are then adjusted and a new value for $S_1$ calculated. This iterative process is carried on until a predetermined convergence criterion is met indicating that a sufficient degree of sharpness has been achieved. Convergence criteria may be included for reaching a predetermined value of $|S_1|$ or it may be determined from the relative change $\epsilon$ in $S_1$ from one iterative step (M) to the next (M+1), i.e. $<|(S_1(M+1)-S_1(M))/S_1(M)|=|S_1(M+1)/S_1(M)-1|$.

FIGS. 7(a)-7(c) illustrate an example of image improvement using the method. FIG. 7(a) shows the geometry including seven single apertures arranged in a hexagonal pattern. Interferometric images are shown where the dark and light banding across the individual apertures indicate TTP errors. Note that the interferometer has been adjusted so that the central subaperture has negligible TTP errors and therefore has negligible banding. The object in the reconstruction was a target of circles and lines. FIG. 7(b) shows the composite image when all sub-images are synthesized and summed incoherently. The composite image is blurred because of the lack of coherence between subapertures. The image data from each subaperture was then subjected to adjustment of TTP parameters with the $S_1$ parameter used as the sharpness metric. Following an iterative calculation using the Nelder-Mead Simplex Method where subapertures were digitally co-phased in pairs to co-phase all seven subapertures, the result is shown in FIG. 7(c). It is evident that the image is much sharper as the details of the object can be clearly resolved. Some residual speckle noise is present as a result of the coherent nature of the light. It is well known in the art that such speckle noise may be reduced by averaging multiple independent speckle realizations. Note that the method disclosed herein works not only to correct for geometric errors resulting from misalignment but also for atmospheric phase errors, including anisoplanatism.

Another feature of this algorithm is that because the data is digital, the apertures can be co-phased beginning with small groupings and then proceeding to the entire aperture. For example, one may begin with a digital array that contains data from only two apertures: the center aperture and an adjacent aperture. The center aperture can be regarded as a reference aperture, and the adjacent aperture phase is then varied. As the phase is varied, the image sharpness is used as a metric to determine when the best image is obtained. One can then proceed to other pairings or groups of apertures until the entire array is phased as is further discussed below.

Reduced Alignment Variables: Piston Only Correction

Under certain circumstances, correction of the aberrations present might allow that the sharpness be optimized for a reduced set of variables. For example, sometimes it may only be necessary to correct for piston alignment of the apertures. This case can arise if the subaperture size is small compared to $r_0$. The algorithms used can be easily adapted for reduced sets of variables. In practice, reduced variable sets allow high-speed aberration determination, and this coupled with fast error correction enables high-bandwidth system performance. Systems with piston only correction are thus very promising with this method.

DEW Phase

Once the high resolution image has been reconstructed the second phase of delivering a laser beam to a target commences.

Step 5. Determine aimpoint. Given that the reconstructed image has high spatial resolution the aimpoint for a laser can be determined. This may be done manually whereby an operator inspects an image and locates an aimpoint. This process is generally too slow to be useful, and it is frequently desirable to automate this task by also having a computer extract features from the image and determine the aimpoint.

Step 6. Calculate a phase screen. The next step is to calculate a phase screen such that when applied to the transmitted beam the laser beam propagates to the target with a minimum footprint. As noted above, in the presence of significant turbulence this phase screen varies with position in the target plane. However, it is a significant feature of the disclosed invention that all field information is retained in the calculations, such that an optimized phase screen can be determined for any isoplanatic patch within the FOV. This is clear by virtue of the fact that the entire image is sharpened. Consequently, the relationship between object position and complex amplitude at the entrance pupil (and consequently any other arbitrary plane within the transceiver) is known.

Step 7. Direct the pointing of the weapons laser beam. This step involves directing the laser beam such that it points to the selected aimpoint. This is generally done using conventional actuators, such as rotating mirrors to direct the beam.

Step 8. Predistort the weapons laser beam with the calculated phase screen. In this step, the phase screen is applied to the laser beam as the phase conjugate of the received phase. In practice, this means using element 415 in FIG. 4 to change or alter the phase of the transmitted beam to a predetermined value. High-bandwidth correction can be accomplished by using high-speed actuators, such as fast tip-tilt actuators for each subaperture with electro-optic (EO) phase modulators for piston correction. A number of other devices are also available for performing this predistortion and operation of the invention is not dependent upon a specific type of device. For example, it is well known that liquid crystal devices are useful in altering the phase of light.

Step 9. Fire the weapons laser beam. The final step is to fire the laser weapon.

Figure 9:
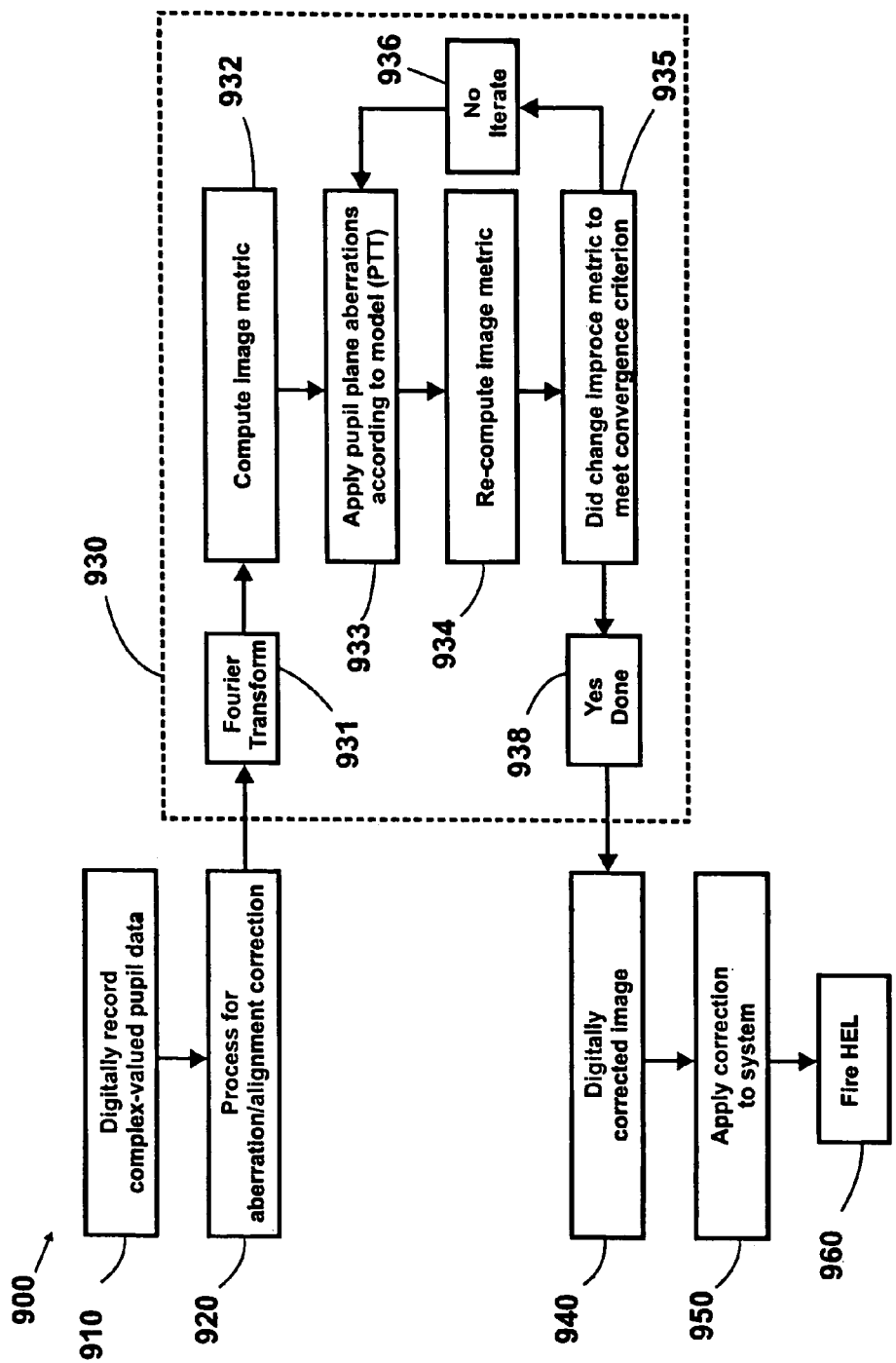
FIG. 9 shows the algorithm or process used to reconstruct images and control a high energy laser (HEL).

To summarize the above process, FIG. 9 shows a flow diagram 900 for the method steps outlined above. Step 910 records complex-valued pupil data which is then used in step 920 to digitally correct for aberrations and/or misalignments. This process is broken down in 930 and generally starts with a Fourier transformation 931 that allows computation of an image metric 932. Pupil plane aberrations are then applied at step 933 which allows the recomputation of the image metric as step 934. If the pupil plane aberrations added in step 933 did not cause the improved metric to converge then decision step 935 passes the program back via 936 to further iterate improvements. Once the convergence criterion is met the program exits the iterative loop at step 938, at which point a digitally corrected image is available at step 940. In the DEW case the corrected image from 940 is then used in step 950 to apply corrections to the HEL system. Following correction of the beam the HEL is fired at step 960.

Transceiver Architecture Examples

Figure 10:
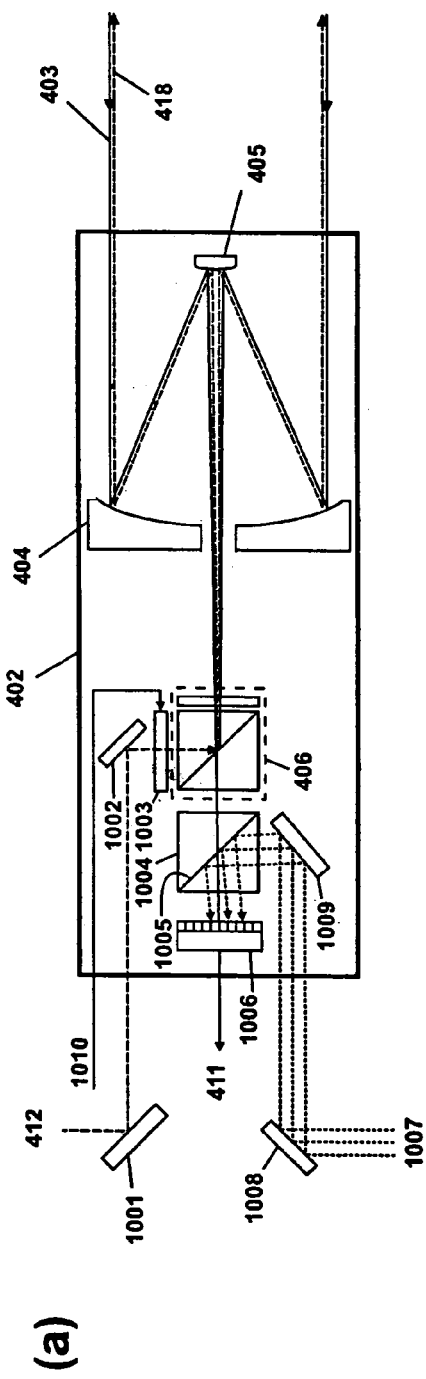
FIG. 10 shows two subaperture transceiver architectures according to the invention.
Figure 10:
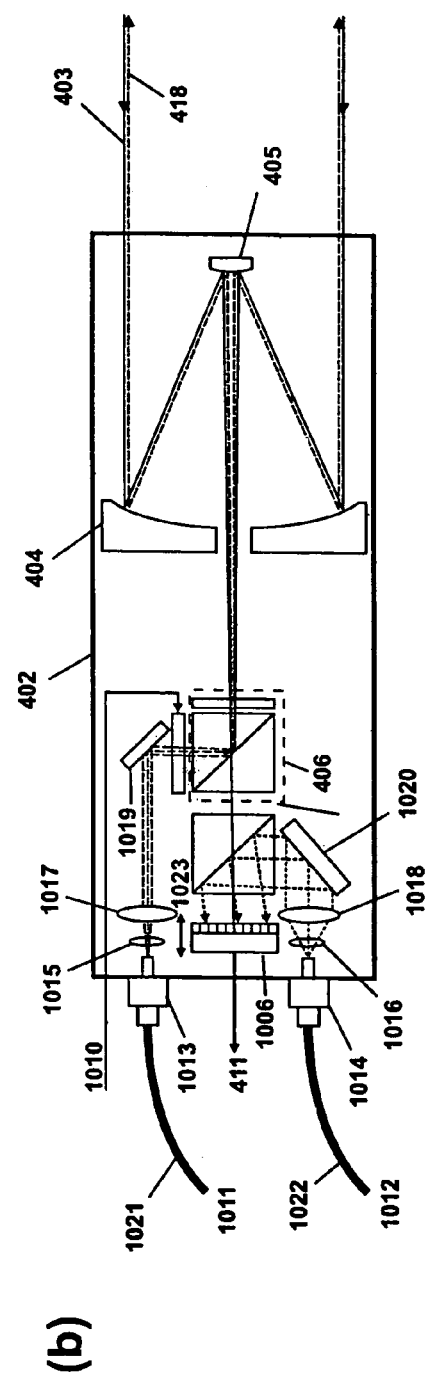

Subaperture transceivers that contain the elements disclosed above can be constructed in several ways. FIGS. 10(a) and 10(b) show two example architectures. A number of elements are the same as those described in the context of FIG. 4 and will not be described in detail again. FIG. 10(a) shows a free-space coupled transceiver where light for transmission 412 is reflected from mirrors 1001 and 1002 and directed out through telescope mirrors 404 and 405 via reflection from transmit/receive switch 406. Mirrors 1001 and 1002 are preferably attached to mechanical mounts (not shown) in order to steer the transmitted beams angularly. Before transmission to the target, the beam also passes through a phase modulation element 1003 that, through an electrical control signal 1010, is used to adjust the phase of the light.

Received light returns as discussed earlier through the telescope 402 and transmit/receive switch 406, passes through partial reflector 1004 and is incident on detector array 1006. The partial reflector may be a simple partially transmitting mirror or a similar element like the illustrated cube which has a coating 1005 designed to transmit a predetermined fraction of the received light power, such as 80%. Simultaneously, local oscillator light 1007 is coupled to the detector via reflection from mirrors 1008 and 1009, as well as reflection from coating 1005. In the absence of absorption losses in the coating, 20% of the LO light reaches the detector surface. One or both mirrors 1008 and 1009 are preferably mounted to adjustors (not shown) that permit the LO beam to be steered to a suitable position on the detector array and to be incident at an angle relative to the signal light. This will produce the desired spatial carrier frequency required to implement spatial heterodyne detection. Signals 411 are transmitted to the signal processing subsystem for extraction of the pupil complex field amplitude.

FIG. 10(b) illustrates a variant on the architecture in FIG. 10(a) and differs mainly in light delivery to the transceiver. For clarity, equivalent components have not been separately numbered in FIG. 10(b). The construction here is to bring the light for transmission, as well as the LO light, to the transceiver using guided wave devices. The term "guided wave devices" refers to a multiplicity of devices used to transport light confined spatially to a generally small dimension. Suitable devices include light pipes, hollow waveguides, self-imaging waveguides, and optical fibers. The latter are of particular interest because of their flexibility and are assumed in this example. Transmission light 1011 and LO light 1012 is carried through fibers 1021 and 1022 and terminated at ports 1013 and 1014. From the termination points, light bundles 1015, 1016 diverge and are collimated using lenses 1017, 1018. Transmission light is reflected from mirror 1019 and transmit-receive switch 406 to the target. As in FIG. 10(a), a phase modulator controlled by signal 1010 may be inserted prior to transmission to the target. It is generally desirable to have at least two surfaces that can be rotated to steer the transmitted beam to the proper location at the target. In addition to the illustrated mirror 1019, this may be implemented in a number of ways. For example, additional mirrors may be incorporated into the transceiver housing. It is also possible to translate the fiber port 1013 or lens 1017 transversely to the beam in order to effect beam steering.

In cases where a single guided wave device is used to deliver both wide angle illumination light as well as narrow divergence HEL light, it is desirable to incorporate a mechanism to alter the divergence of the beam prior to transmission. This may be accomplished in a number of ways. One method is to alter the spacing between the fiber termination 1013 and the lens 1017 by moving the lens along the direction indicated by double arrow 1023 using a suitable actuator.

In the fiber-coupled case, LO light 1016 is brought to the detector surface via reflection from mirror 1020 and coated surface 1005 in a manner equivalent to FIG. 10(a). As with the transmitter beam, it is desirable to have two steering mechanisms (4 degrees of freedom) in the coupling in of LO light, and this can be done using mirror 1020 and other means as discussed above.

System Architecture

Figure 11:
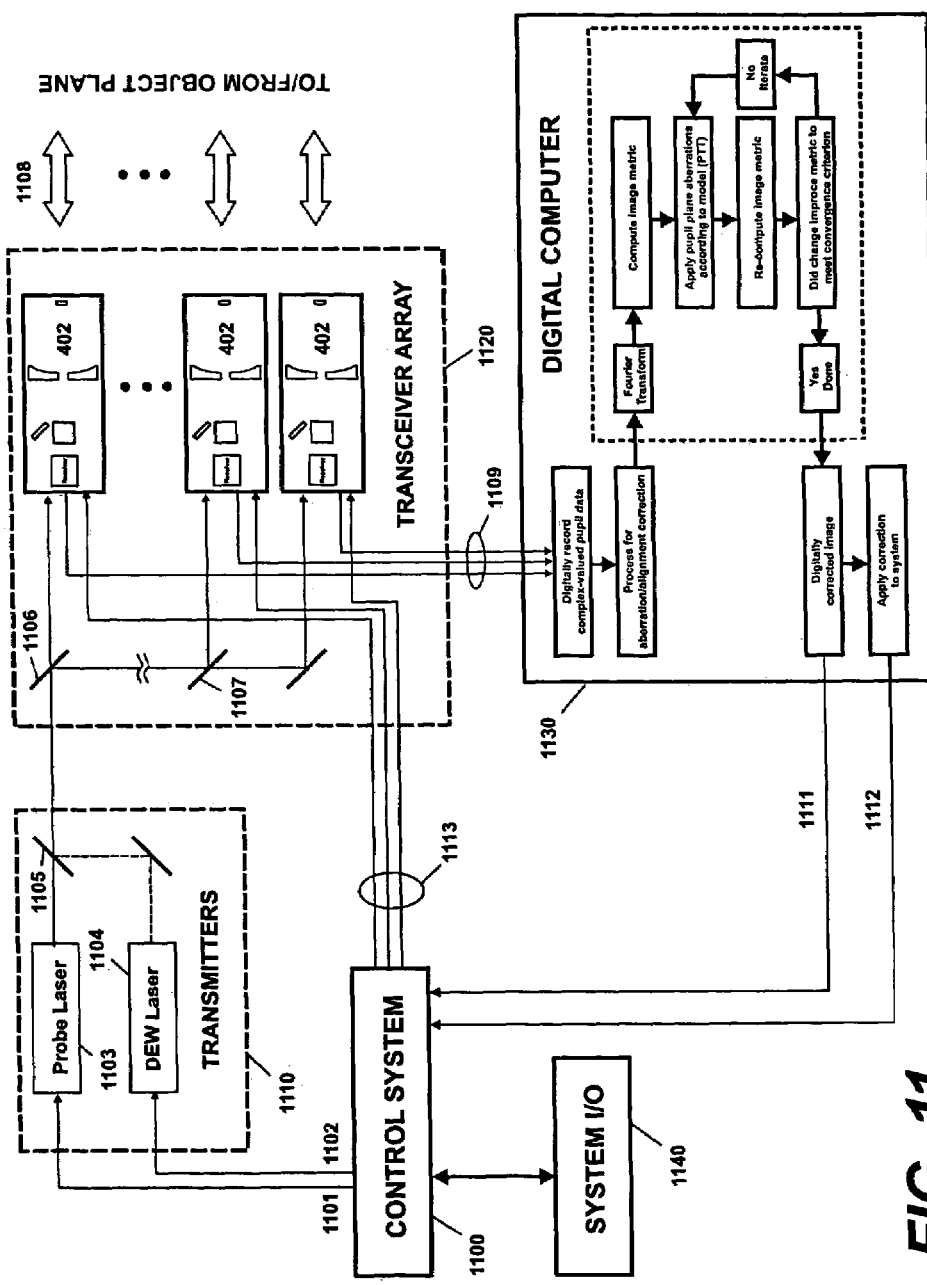
FIG. 11 shows a systems level architecture according to the invention.

The above has discussed subsystems and implementations thereof. FIG. 11 illustrates an architecture for a complete system according to the invention. Although many variations are possible a complete system generally comprises:

A control subsystem 1100 which controls operation of the various subsystems and also exchanges information with a system input/output (I/O) interface 1140.

A transmitter subsystem 1110 that comprises a probe laser 1103 and the high energy DEW laser 1104, which are controlled via lines 1101 and 1102. Depending on the system design, the two lasers may be the same. In cases where they are not, devices or systems such as beam combination optics 1105, may be used to combine the two laser beams to propagate along the same path. In cases where a local oscillator is used, the LO laser may be part of the probe or DEW laser and the LO light transported along the same path from the subsystem.

The transceiver array 1120 comprises a number of subapertures transceivers 402 that receive transmitted light from subsystem 1110 via a set of beam splitting optics 1106-1107 and transmit the light to the target as illustrated by arrows 1108. When used in DEW mode, the transceiver subsystem 1120 generally also receives signals 1113 from the control system 1100 to co-phase the subapertures for transmission. The transceiver array further transmits electrical signals 1109 from the detector arrays.

A digital computer 1130 which receives the detector array signals 1109 and implements the algorithms described in FIG. 7 to reconstruct high resolution images for output 1111 to the control system, as well as to calculate phase screen information for output 1112 to the control system.

Alternative Embodiments

Figure 4:
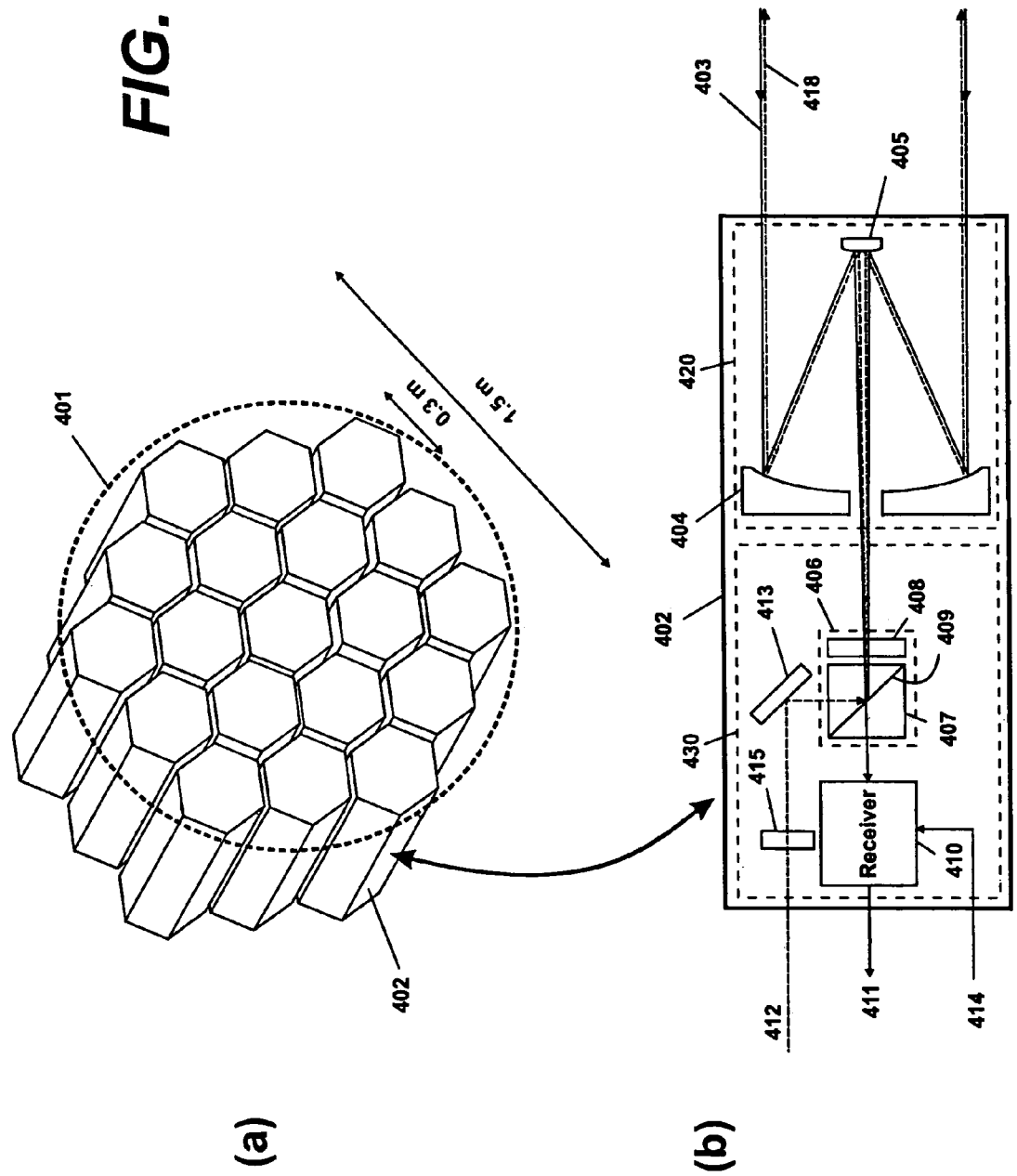
FIG. 4 illustrates a large aperture imaging architecture according to the preferred embodiment of the invention.
Figure 8:
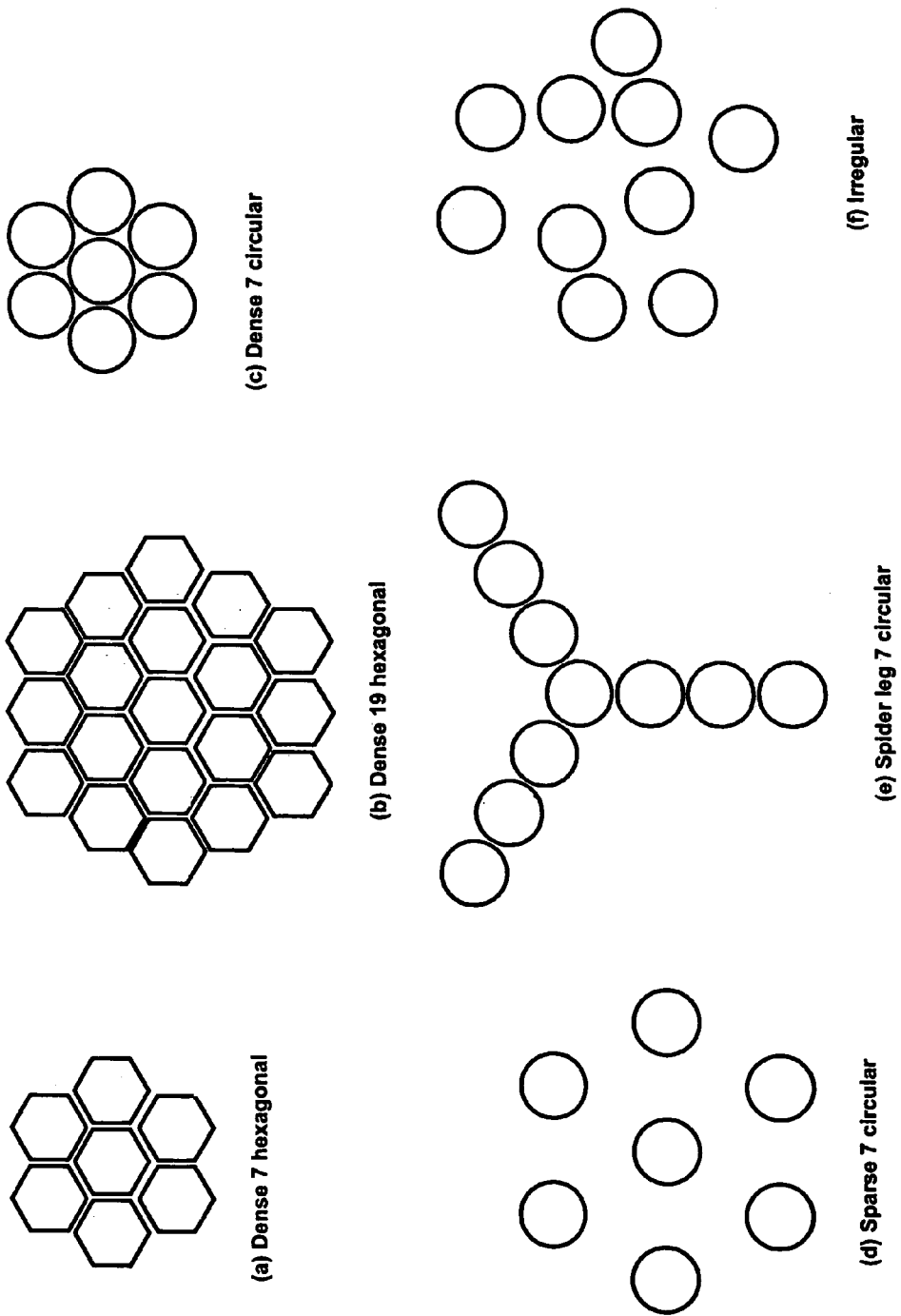
FIG. 8 shows multiple examples of subaperture geometries.

Aperture geometries. The example illustrated the invention under the assumption of a specific geometry of subapertures (hexagonal) as illustrated in FIG. 4. The invention is not dependent on a specific geometry. Examples of geometries are shown in FIGS. 8(*a*)-8(*f*). The example used above is shown in FIG. 8(*a*) showing a front view of 7 densely packed hexagonal subaperture transceivers. FIG. 8(*b*) illustrates that larger arrays of hexagonal STs can easily be formed. The hexagonal geometry is sometimes desirable as it permits very high packing density. At the same time circular geometries are easier to fabricate and a dense 7 array of circular subapertures is illustrated in FIG. 8(*c*). It is further noted that there is no requirement to pack subapertures densely. Examples of sparsely packed geometries are shown in FIGS. 8(*d*) and 8(*e*). There is in fact no requirement that the geometry must be regular as illustrated by the irregular geometry of FIG. 8(*f*). Such irregular aperture distributions may be particularly suitable to conform to available space on board aircraft or other sensor platforms. What is important in all cases (including the dense hexagonal case used as an example) is that the lateral pupil geometry is known and the appropriate geometry factors incorporated into the reconstruction of the wavefronts for the full aperture.

Figure 12:
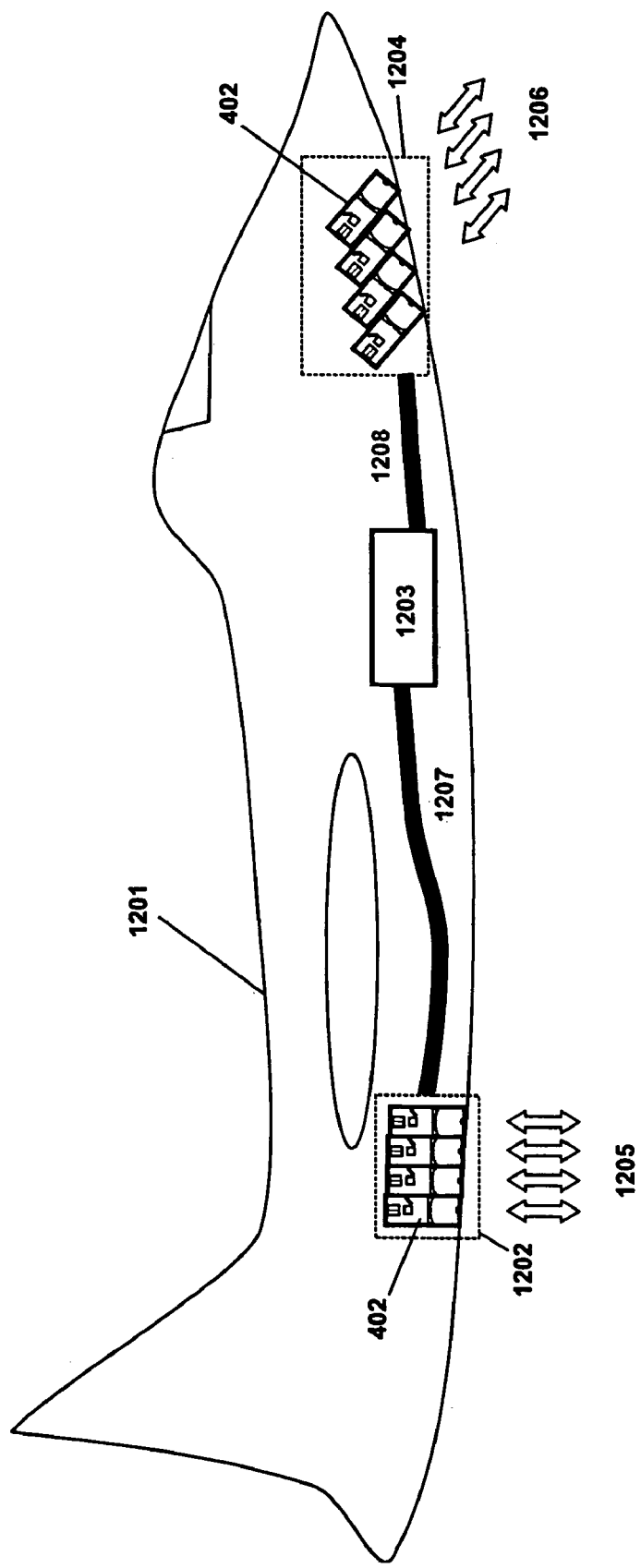
FIG. 12 illustrates examples of conformal apertures used for a system installed in an aircraft.

Conformal apertures. A significant benefit of the disclosed system is that division of a large aperture into a number of smaller subapertures permits the subaperture transceivers to be relatively small. Furthermore, the ability to digitally reconstruct images means that the spatial relationship between STs may be relaxed. An important consequence is that it is not necessary to construct the ST array in a specific shape. Rather, it is possible to construct conformal apertures where the relative position of the STs follow the shape of a structure. As an example, FIG. 12 shows an aircraft 1201 incorporating a system of the present invention. Using the notion of conformal apertures it is possible to mount a set of individual STs 402 into an assembly 1202 that conforms to the bottom skin of the aircraft for transmission of light in the downward direction 1205. Alternatively, the ST 402 could be incorporated as an assembly 1204 and built into a forward section of the aircraft for light transmission at a slant angle 1206. In both cases, the controls, computer systems, and other portions of the system 1203 may be located remotely from the ST assemblies and connected thereto via conduits 1207 and/or 1208 that carry electrical and optical signals. It is stressed that FIG. 12 uses specific implementation examples for illustrative purposes only. Systems of the disclosed design may be mounted in many different ways into a host of platforms, including but not limited to ground- and sea-based vehicles, aircraft, pods, missiles, and satellites.

Alternative coherent detection methods. As noted with reference to Equation 1, coherent detection may be implemented in a variety of ways that depend largely on the form of the local oscillator phase field $\Phi_{LO}(\vec{r},t)$. The following discloses methods other than the spatial heterodyne technique disclosed above.

Figure 13:
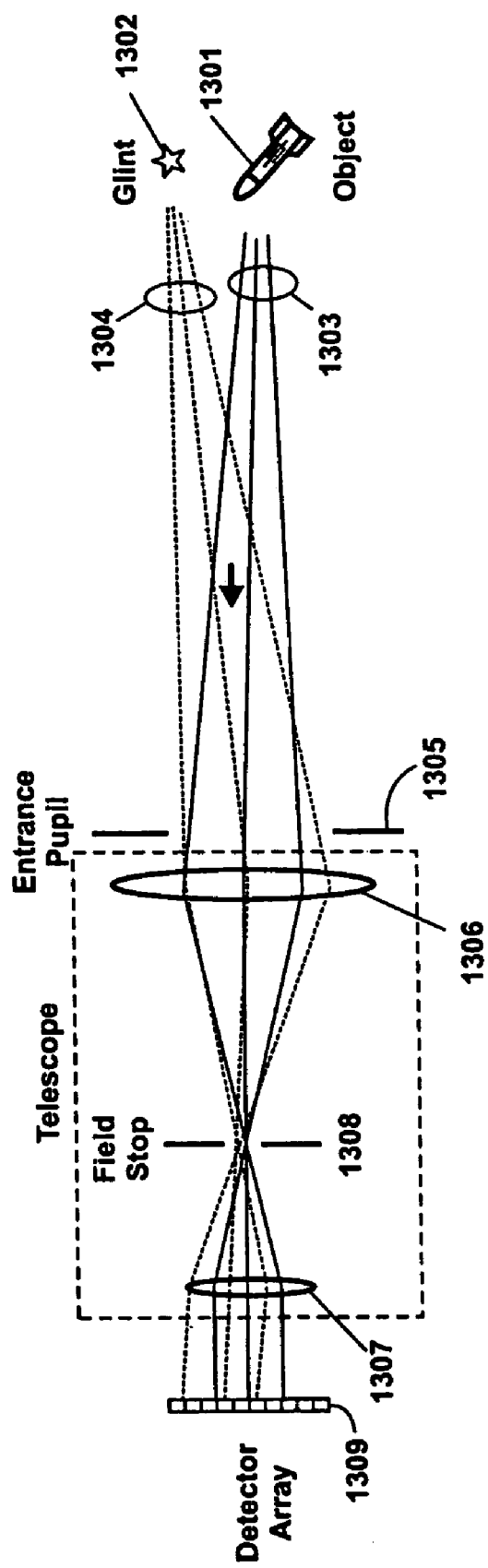
FIG. 13 illustrates spatial heterodyne sensing using a glint as the local oscillator.

Glint (holographic) recording. The spatial heterodyne technique uses temporal coherence between the local oscillator field and the received signal. Preferably, the coherence length is greater than twice the target range, and consequently, a very narrow band laser source is preferred. An alternative implementation that circumvents this limitation is possible when a glint exists in or near the target FOV. This glint acts as a localized point source and can be used as the local oscillator. Because of the similarity with holographic methods of recording information, this technique is also referred to as holographic recording. It is noted that it is not required that a highly scattering point source physically exists near the target, but that it is possible to create an artificial glint by illuminating a small target area with an intense fraction of the transmitted beam. This is referred to as creating a "beacon." FIG. 13 illustrates implementation of glint recording in the context of the present invention. For simplicity in illustration, many details have been omitted in comparison with previous figures. In FIG. 13, light 1303 is scattered from the object 1301 and is also scattered as beams 1304 from a glint object 1302. The scattered light enters the entrance pupil 1305 of the telescope, here represented by lenses 1306 and 1307. A field stop 1308 may be present to limit the acceptance angle of the light reaching detector array 1309. Under the assumption that the glint is a point source at a great distance from the receiving system it will act as a plane wave at the entrance pupil, as well as at the detector array. In the case of strong atmospheric distortions, the glint may not act as a point source (as seen from the imaging system). In this case, the field stop may be used to effectively force the glint image to become point-like. Interference between the object light and the glint light will produce the same type of carrier modulate intensity distribution as the conventional spatial heterodyne case described in detail above. The difference, however, is that temporal coherence between the glint light and the object light only requires that the difference in range between the glint origin and the object is within the coherence length of the laser. This may strongly relax the requirement on coherence length of the source, particularly for imaging at great distances. In terms of the LO phase field the form $\Phi_{LO}(\vec{r},t) = \vec{k}\cdot\vec{r}$ is the same as in the spatial heterodyne case.

In the context of glint recording it is noted that for some applications it is possible to create a glint source by covertly deploying an enhanced reflector, such as a corner-cube or reflective tape or similar device, at or near a location where surveillance is to take place. This is useful, for example, if high-resolution imaging of a site is desired to track movement of people or material, and it is possible to deploy such an enhanced reflector in the vicinity of the target area subject to surveillance. It is well known to persons reasonably skilled in the art that such devices can produce a local effective reflectivity several orders of magnitude greater than that obtained from non-enhanced, for example, diffuse, scatterers.

Figure 14:
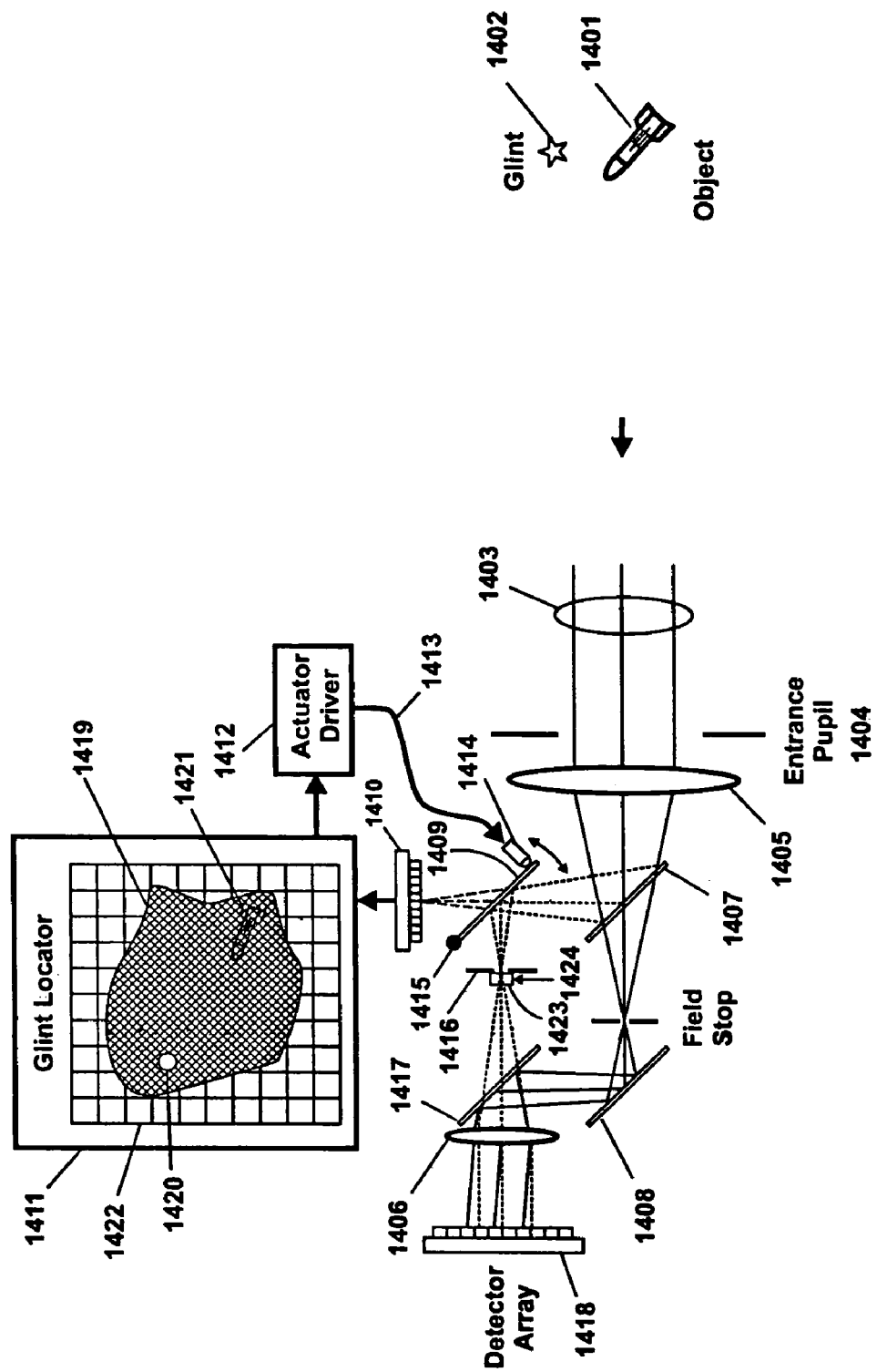
FIG. 14 illustrates the use of a glint as the LO when the glint location is a priori unknown.

Self-referencing heterodyne. A second variation in detection mode is the self-reference mode that also has $\Phi_{LO}(\vec{r},t)=\vec{k}\cdot\vec{r}$. This operating mode is illustrated in FIG. 14 and is similar to the glint case in the sense that no separate LO beam is required. In the self-referencing mode, the return light 1403 arising from a target field presumed to contain a feature that acts as a glint 1402 in addition to the object of interest 1401. After passage through entrance pupil 1404, the light is split into two images by beam splitter 1407. One part of the field passes through a field stop as discussed above, reflects from mirror 1408 and partial reflector 1406 onto detector array 1418. The portion of the light reflected from beam splitter 1407 is split again with beam splitter 1409. The reflected portion of the light is incident on a fixed aperture 1416 with the intent that light from the glint is transmitted through the pinhole, combined with the signal light in beam splitter 1417, and transmitted through second telescope lens 1406 to the detector array 1418. Any of a number of optical elements, for example beam splitter 1417, may be rotated to produce the desired angular shift between the LO and signal beams.

This method uses a bright glint portion from the illuminated FOV that passes through aperture 1416. In cases where a glint position in the FOV is not known it can be found and directed to the aperture as follows. The portion of the light transmitted through beam splitter 1409 is incident on a second detector array 1410 which sends an image to a glint locator subsystem 1411. This subsystem analyses the intermediate image 1422. Generally, the image will contain a region 1419 with light from the illuminated FOV that contains the object of interest 1421 and a small region of higher intensity. The glint locator identifies the spatial location of the glint and transmits position coordinates to one or more actuator drivers 1412 that in turn transmit drive signals 1413 to one or more actuators 1414. The purpose of actuators 1414 is to act on one or more mirrors such that the reflection angle from mirror 1409 is altered. As an example this may be implemented by fixing one side 1415 of mirror 1409 while permitting actuator to push on the opposite side of the mirror to effect rotational motion along the direction indicated by the double arrow. This is clearly only one possible method of adjusting the mirror. The purpose of this motion is to move the mirror until the corresponding portion of the image containing the glint passes through aperture 1416. It is a simple matter to calibrate this system such that glint position in the FOV can be translated to mirror position required to pass the glint through the aperture 1416.

Quadrature detection $\Phi_{LO}(\vec{r},t)=P$. Quadrature detection (also referred to as I/Q or in special cases homodyne detection) is the case where the carrier frequency has been eliminated and the LO field is constant at some phase P and interferes with the signal field with zero angular offset. For a single phase value P (homodyne case), it is not possible to retrieve full phase information about the complex amplitude of the incident field. However, if the signal field is stationary in time and the LO phase value P is altered, the full phase information can be recovered by taking multiple samples of the intensity at a detector array with several LO phase values $P_1, P_2, \ldots P_N$. For example, if the phase is allowed to take on the values P=0, $\pi/2$, $\pi$, and $3\pi/2$ and the intensity I in the detector is measured, the complex electric field $E_s$ at any point is given by the equation (in the case where the LO amplitude is constant)

$$E_S(\vec{r},t) = \frac{1}{2A_{LO}}\left((I_0(\vec{r},t) - I_P(\vec{r},t)) + i\left(I_{\frac{\pi}{2}}(\vec{r},t) - I_{\frac{3\pi}{2}}(\vec{r},t)\right)\right) \quad (2)$$

Figure 5:
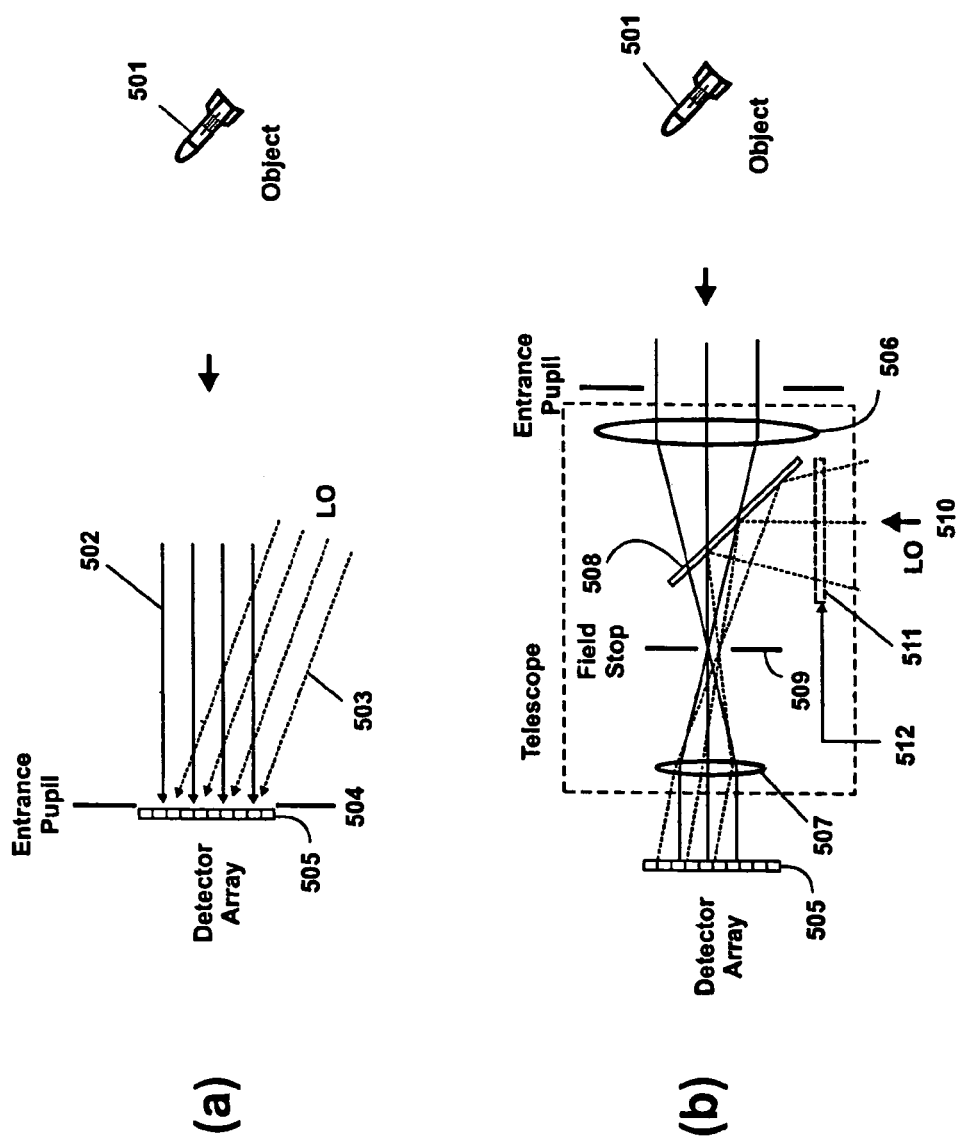
FIG. 5 illustrates the use of spatial heterodyne detection to measure the complex amplitude of scattered light.

Implementation of quadrature detection can be done by simply inserting a controllable phase shifter (such as a liquid crystal element or an electro-optic element) into the path of the LO beam. Modifications to the spatial heterodyne case described in FIG. 5 are: tilt mirror 508 to ensure coalignment between the LO and the signal fields; insert a phase modulator 511 in the path of the LO beam; and provide a means to input a control signal 512 that permits alteration of the LO beam phase.

Quadrature detection may also be implemented in the glint detection method of FIG. 14 by inserting a phase shifting element 1423 at the location of the aperture 1416. This phase shifting element may be controlled via an input signal 1424.

Figure 15:
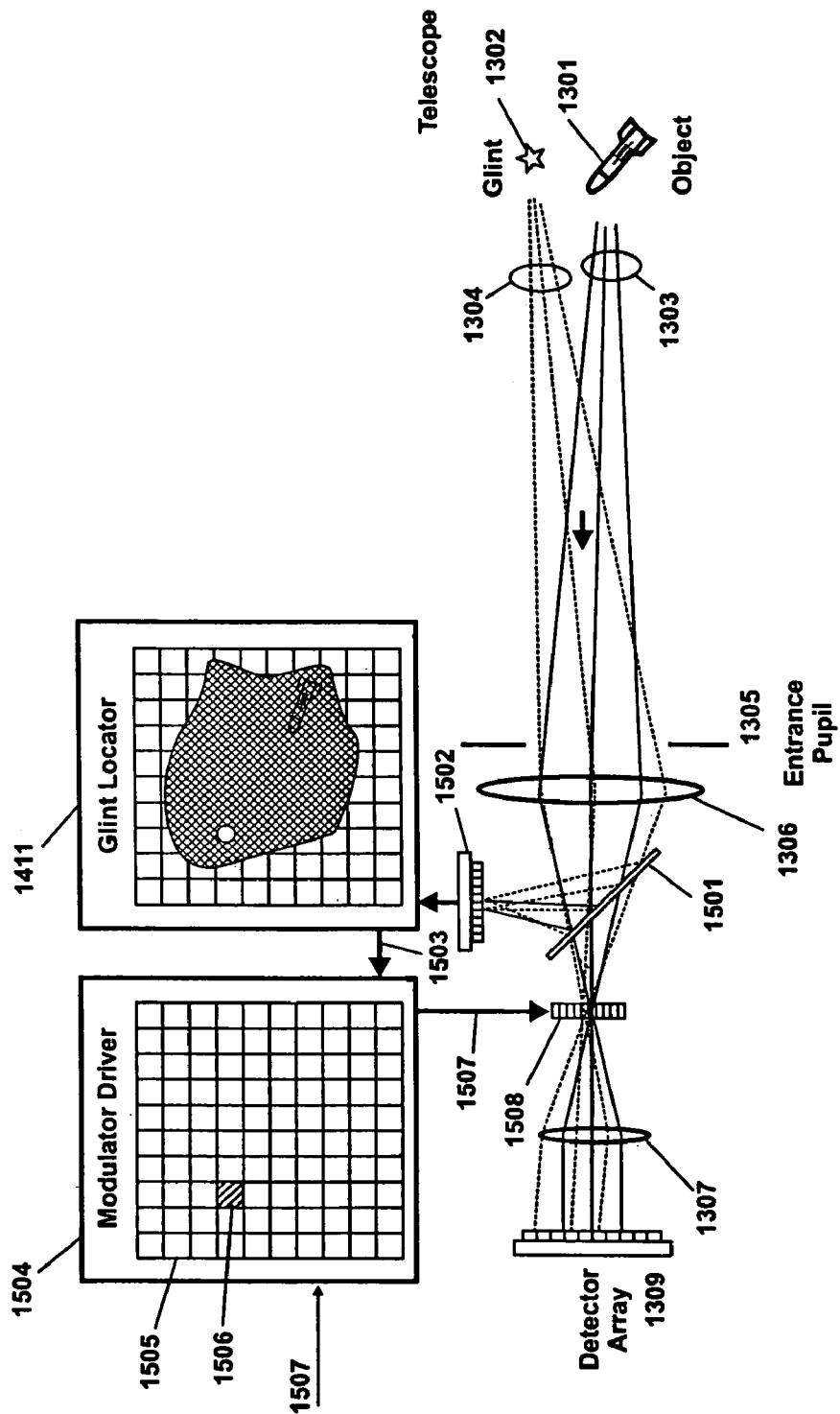
FIG. 15 illustrates implementation of a self-referencing architecture for quadrature detection.

An alternative implementation using glint detection is illustrated in FIG. 15. The overall architecture is similar to FIG. 13 and will not be discussed in detail again. However, in the case shown in FIG. 15 the received light is split into to fractions using beam splitter 1501. The transmitted portion propagates through a spatial phase modulator 1508 and further to the detector array 1309. The field reflected from 1501 is incident on a second detector array 1502, which is connected to a glint locator as described above in FIG. 14. As in FIG. 14, the purpose of the glint locator is to locate the coordinates in an image where a glint is located. Unlike the case in FIG. 14, the glint locator is now connected via 1503 to a phase modulator driver. Spatial phase modulator 1508 comprises an array of elements that can alter the phase of light transmitted through (or with slight alterations to the geometry, reflection from) the element. The modulator driver 1504 contains a map 1505 of the phase shifts applied to all elements in the spatial phase modulator. When the glint locator locates a glint feature in the FOV, the coordinates are transferred via connection 1503 to the modulator driver which in turn can then change the phase of the specific coordination location indicated in this example by 1506. The value of the phase can be input on line 1507 from the control system. The result of this arrangement is that the phase of an identified glint acting as the local oscillator can be changed to multiple values in order to recover the complex field of the signal as described above. It is noted that a main advantage of quadrature detection is that it reduces the number of detector pixels required for a given spatial resolution since it reduces the spatial frequency content of the mixed signal.

Temporal heterodyne $\Phi_{LO}(\vec{r},t)=\Delta\omega t$. An alternative to the above methods is to alter the frequency of the local oscillator beam by an amount $\Delta\omega$ relative to the signal. This creates a temporal beat signal at all pixel locations, from which the relative phase between pixels can be reconstructed. Temporal heterodyning may be implemented in the above discussed architectures by introducing the frequency shift, for example using an acousto-optic modulator. For example, if element 511 is an acousto-optic modulator driven with signal 512 the architecture shown is suitable for temporal heterodyne measurements. Note that these can be carried out independently of an angular shift between the LO and signal. Modifications of the architectures in FIGS. 14 and 15 also permit implementation of temporal heterodyning provided that the phase shifting elements are replaced by frequency shifting elements. It is noted that there is little distinction between phase shifting and frequency shifting since a cyclical phase shift corresponds to a frequency shift. In the case of temporal heterodyne sensing (or non-temporal heterodyne methods in the presence of large Doppler shifts), it is noted that the detector arrays as well as the associated read-out electronics and signal processing equipment perferably have sufficient bandwidth to follow the temporal variation of the interference signals.

Hybrid recording techniques. Based on the methods disclosed above it is also possible to combine recording approaches into hybrid techniques. As an example it is possible to combine the spatial heterodyne recording technique with a frequency offset and thereby perform a hybrid spatio-temporal heterodyne recording. In the context of hybrid techniques in particular, it is important to note that the wavefront recording technique disclosed by Brosnan cited in the introduction appears to be similar to temporal heterodyne glint recording. However, there is a distinct difference. Brosnan uses a fixed geometry and the local oscillator "glint" is derived from whatever spatial mode (position in the object plane) that the system happens to be aligned to. As a result, a strong local oscillator is only present if the alignment if fortuitously aligned with a bright spot. Particularly in a moving environment, the probability of this occurring at any given time is generally low and leads to temporal fluctuations of the LO strength. In contrast, the method described herein, where the recording system is adjusted to ensure that a bright spot in the FOV is utilized for the LO, does not suffer from this limitation.

Co-phasing algorithms and metrics. The term "sharpness" as used in this disclosure refers generally to an image quality criterion rather than a specific metric. The above discussion noted use of the sharpness metric $$S_1 = \sum_m \sum_n (I(m,n))^2$$

to co-phase the subapertures. It is understood that this is used as an example only. Other sharpness metrics exist and can be used. Examples would be those that compute higher order intensity powers, such as $$S = \sum_m \sum_n (I(m,n))^M$$

where M>2. With a sharpness metric being an indicator of the quality of the image, the general concept is to apply changes to the pupil-plane phase and assess whether they improve the image quality as indicated by a change in the sharpness value. The task is thus an optimization problem where a series of input variables are modified to find an optimized solution. One approach is to begin with a set of parameter values (for example, piston, tip and tilt) for all subapertures. Each parameter is then varied slightly so as to numerically determine the gradient corresponding to changes in the sharpness that result from changes in the parameter values. By computing the gradient of the multiple variables, one can determine the changes to the parameter values that have the largest impact on the sharpness. The parameter values are then changed accordingly to improve the sharpness. This process is repeated until the sharpness is suitably optimized. This general class of algorithms is often referred to as steepest descent algorithms. Depending upon whether the metric requires maximization or minimization the method may alternatively be referred to as steepest ascent.

Another class of algorithm for maximizing image sharpness is the simplex method. This method is also an iterative method and involves first computing the sharpness for three sets of parameter values. The sharpness values are then compared and the parameter set that gives the lowest sharpness is then modified; the modification is determined using simple geometric construction. An application of this algorithm for wavefront control is discussed in S. S. Chesnokov and I. V. Davletshina, "Simplex method in problems of light-beam phase control," Appl. Opt. 34, 8375, 1995.

Yet another method for optimizing sharpness is to analytically (rather than numerically) compute the gradient and then iteratively maximize the sharpness. This method can be more efficient than the numerical gradient methods. [J. R. Fienup and J. J. Miller, 'Aberration correction by maximizing generalized sharpness metrics,' J. Opt. Soc. Am A, 20, 609, 2004]. Any suitable specific method may be used, including but not being limited to the specific examples cited above.

Figure 16:
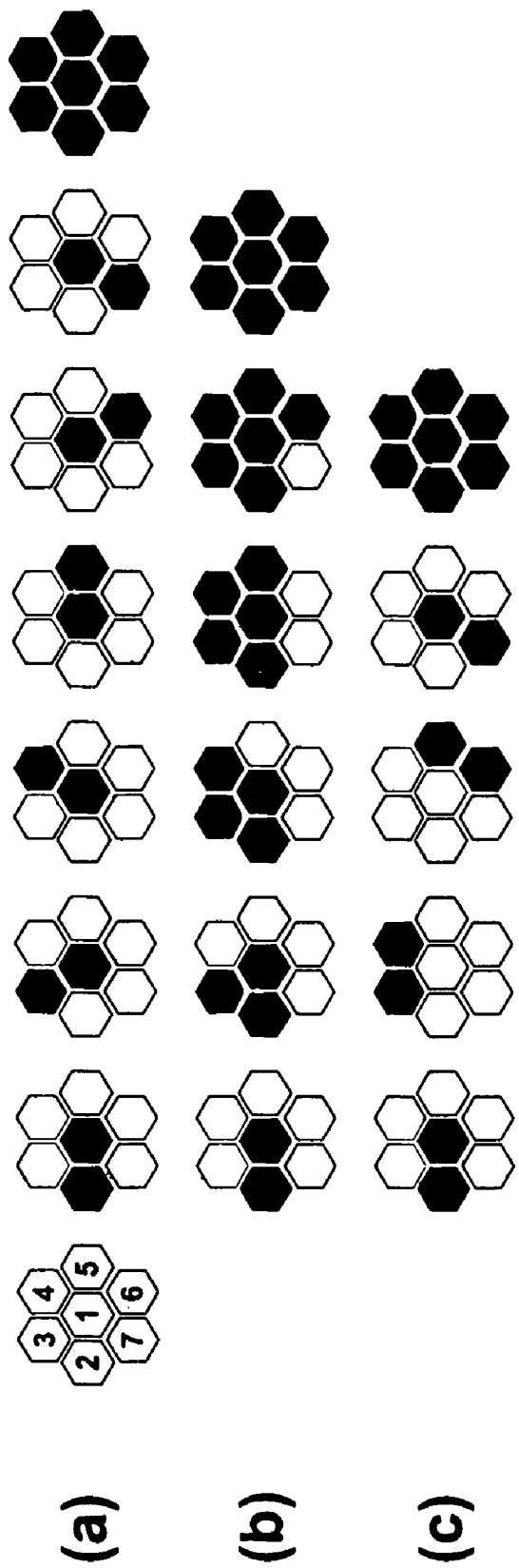
FIG. 16 illustrates exemplary computational processes for co-phasing subapertures.

The computational process of co-phasing subapertures may be carried out in a variety of ways, as illustrated by several examples in FIGS. 16(a)-(c). In these examples it is assumed that 7 subapertures are present, numbered 1-7 as shown in FIG. 16(a). Blackened subapertures indicate the ones involved at any given step in the process. The pairwise approach noted above selects one subaperture, such as number 1, as a reference. The co-phasing then proceeds from left to right. In the first step, subaperture 2 is co-phased with subaperture 1. In the next step, subaperture 3 is co-phased with subaperture 1, and this pairwise process proceeds around the structure until all individual subapertures 2-7 have been co-phased with the reference. At that point, all subapertures are co-phased. Further optimization may be used to tweak each one against the co-phasing metric resulting from full set of subapertures.

An alternative method is illustrated in FIG. 16(b), where co-phasing of all subapertures is done by co-phasing a given subaperture to the previous set. Yet a third method, shown in FIG. 16(c) involves co-phasing independent pairs of subapertures until finally all pairs are co-phased. It is also possible to simply co-phase all subapertures simultaneously.

It is stressed that the disclosed invention is not reliant on any given co-phasing method and that the above cases are merely examples of a large number of possible methods. It is further stressed that the choice of co-phasing method need not be fixed, but algorithms can be implemented that permit selection of specific methods to meet specific criteria for a given measurement situation. It is generally found, for example, that if no TTP information is available a priori, the pairwise method of FIG. 16(a) is computationally efficient and fast. This is so because at any given stage only three parameters need to be optimized. In contrast, if all subapertures are simultaneously altered, the relative impact on the metric of changes to a single subaperture is relatively small. This may result in many iterative steps before the calculations converge to a predetermined convergence criterion. In other cases, it may be found that certain subsets of subapertures tend to be less prone to drift. In such cases, it may not be necessary to re-start the co-phasing from the beginning but rather to bring error-prone subapertures into alignment on a selective basis. As a final example of the desire for adaptability in the co-phasing method, it was noted above that the multiplicity of subapertures makes the system degrade gracefully in the event of loss of one or more subapertures. In the event of such loss, it is clearly undesirable to waste computational resources on subapertures that do not contribute to the sensor.

Higher-order aberrations. The discussion above has centered around the reconstruction of wavefronts in the presence of tip, tilt, and piston errors. This is normally sufficient in cases where the aperture is smaller than the coherence radius. At the same time the disclosed methods are in no way limited by this criterion, but can handle any aberrations. A number of methods are available, one convenient method being the decomposition of aberrations into Zernike polynomials. These polynomials are well known in optics are provide a convenient way of describing general aberrations in terms of cylindrical coordinates. In fact the first three Zernike polynomials correspond to piston, tip, and tilt. Computationally the consequence of including higher order aberration correction therefore consists of including further terms in the iterative optimization routines. Thus, instead of having a total of 3N degrees of freedom to optimize in the TTP case, in the generalized case there are P N terms, where P is the number of included Zernike polynomial terms.

Laser sources and wavelengths. Nothing in the above disclosure should be construed as requiring specific laser source types or wavelengths for proper operation. An operational system can be built and operated at any wavelength. For practical purposes, where the system is operated in conjunction with a high energy laser, it is normally desired that the system operates at a wavelength (or range of wavelengths) where efficient laser sources exist. At present, efficient lasers include solid-state lasers, such as neodymium (Nd) and ytterbium (Yb) lasers operating near 1 micrometer (exact values depends on the laser host material and other factors), sometimes referred to as "1 micron" lasers. A second wavelength of interest is near 1.5 microns, where suitable sources include erbium (Er) lasers. These lasers are sometimes referred to as "1.5 micron" lasers, even though it is well known that erbium lasers may emit over a broad range of wavelengths extending from approximately 1.5 microns to greater than 1.6 microns. A third wavelength range of interest is near 10 micrometers, due to the existence of efficient carbon dioxide ($CO_2$) lasers. This wavelength region is sometimes referred to as "10 microns" even though $CO_2$ lasers can be made to emit at wavelengths not restricted to be exactly 10 micrometers. Additional wavelength regions are also of interest, generally through the infrared spectrum from approximately 0.8 micrometers to >10 micrometers, where sources are too numerous to list individually.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An imaging method for producing improved resolution images, comprising:
    illuminating an object with coherent radiation;
    with a plurality of subapertures, collecting light scattered from the illuminated object;
    coherently detecting the light collected by each of the subapertures;
    digitally reconstructing images from the coherently detected light for a set of the subapertures; and
    digitally co-phasing the subapertures in the set of the subapertures using an image sharpness metric to form an image of the object comprising the digitally reconstructed images.

2. The method of claim 1, wherein the coherently detecting comprises measuring the complex amplitude on each of the subapertures and the constructed image has substantially a resolution of a total area of the subaperatures in the set.

3. The method of claim 1, wherein the set of subapertures comprises all of the plurality of subapertures.

4. The method of claim 1, wherein the subapertures are arranged in a regular array or in an irregular array.

5. The method of claim 1, wherein the illuminating comprises operating a laser to produce the coherent radiation in the form of laser light at or below a wavelength of about 10 microns.

6. The method of claim 1, wherein the coherently detecting comprises spatial heterodyne detection, temporal heterodyne detection, or quadrature detection.

7. The method of claim 1, wherein the coherently detecting comprises detection of glint, the glint being provided by transmission of a beacon or derived from an illuminated feature in the field of view of the subapertures.

8. The method of claim 1, wherein the coherently detecting comprises detection of glint, wherein the glint is located in the field of view of the subapertures and the coherently detecting comprises using the located glint as local oscillator beam input.

9. The method of claim 1, wherein the image sharpness metric is the sum of square of intensities of the coherently detected light or is the sum of higher order power of the intensities of the coherently detected light.

10. The method of claim 1, wherein the co-phasing comprises: using a pairwise algorithm to co-phase all of the subapertures in the set; altering relative tip, tilt, and/or piston, and/or higher order phase aberrations for each of the subaperatures in the set to enhance the image sharpness metric; applying co-phasing corrections to different areas of the field of view to correct for anisoplanatism; using a steepest descent algorithm; using a simplex method; and/or compensating for geometric alignment of the apertures in the set.

11. The method of claim 1, further comprising:
    identifying an aimpoint within the formed image;
    determining a phase screen for the aimpoint;
    directing a multiplicity of laser beams through the subapertures towards the aimpoint; and
    co-phasing the multiplicity of laser beams by applying the phase screen to the laser beams propagating through the subapertures to form a high power laser beam.

12. The method of claim 11, further comprising firing the high power laser beam to illuminate a portion of the object.

13. The method of claim 11, wherein the laser beams are provided by lasers selected from the group consisting of 1 micron lasers, 1.5 micron lasers, and 10 micron lasers.

14. The method of claim 11, wherein corrections are applied to different areas of the field of view to correct for anisoplanatism.

15. The method of claim 11, wherein the multiplicity of laser beams are derived from a single laser.

16. An imaging system comprising:
    a laser for illuminating a field of view;
    a plurality of subaperture transceivers for receiving and detecting light scattered from the field of view using coherent detection; and
    a processing system for calculating a complex electric field at a set of the subaperture transceivers and for forming an image.

17. The imaging system of claim 16, wherein the processing system is further operable for determining a target point in the formed image, and wherein the imaging system further comprises a high-energy laser for outputting a high energy laser beam through the subaperture transceivers toward the target point.

18. The imaging system of claim 17, further comprising a laser beam distorter distorting the output high energy laser beam such that the distorted high energy laser beam arrives at the target point with a substantially diffraction-limited footprint.

19. An imaging method for producing high-resolution images, comprising:

illuminating an object with coherent radiation from a laser;

with a plurality of subapertures, collecting light scattered from the illuminated object;

coherently detecting the light collected by each of the subapertures using heterodyne detection; and digitally co-phasing the subapertures in the set of the subapertures using an image sharpness metric to form an image of the object having substantially the resolution of the total area of all the subapertures in the set.

20. The method of claim 19, further comprising identifying an aimpoint in the formed image, directing a plurality of laser beams through the subapertures in a direction opposite the collected light, co-phasing the plurality of laser beams into substantially a single beam, and firing the single beam at the aimpoint.

\* \* \* \* \*